US010485020B2

(12) United States Patent
Vajapeyam et al.

(10) Patent No.: US 10,485,020 B2
(45) Date of Patent: Nov. 19, 2019

(54) TECHNIQUES FOR UPLINK TRANSMISSION MANAGEMENT

(71) Applicant: QUALCOMM Incorporated, San Diego, CA (US)

(72) Inventors: Madhavan Srinivasan Vajapeyam, San Diego, CA (US); Aleksandar Damnjanovic, Del Mar, CA (US); Tao Luo, San Diego, CA (US); Wanshi Chen, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/256,779

(22) Filed: Jan. 24, 2019

(65) Prior Publication Data

US 2019/0159242 A1 May 23, 2019

Related U.S. Application Data

(63) Continuation of application No. 15/153,656, filed on May 12, 2016, now Pat. No. 10,225,859.
(Continued)

(51) Int. Cl.
*H04W 4/00* (2018.01)
*H04W 72/14* (2009.01)
(Continued)

(52) U.S. Cl.
CPC ........... *H04W 72/14* (2013.01); *H04L 1/1861* (2013.01); *H04W 72/1268* (2013.01);
(Continued)

(58) Field of Classification Search
USPC .................. 370/328, 330, 329, 252; 455/450
See application file for complete search history.

(56) References Cited

U.S. PATENT DOCUMENTS

2010/0002800 A1* 1/2010 Kim ..................... H04L 5/0037
375/295
2010/0035581 A1 2/2010 Park et al.
(Continued)

FOREIGN PATENT DOCUMENTS

WO 2012078565 A1 6/2012

OTHER PUBLICATIONS

Ericsson: "Overview of UL HARQ in LAA," 3GPP Draft; R2-151504—Overview of Ul HARQ in LAA, 3rd Generation Partnership Project (3GPP), Mobile Competence Centre ; 650, Route Des Lucioles ; F-06921 Sophia-Antipolis Cedex ; France vol. RAN WG2, No. Bratislava, Slovakia; Apr. 20, 2015-Apr. 24, 2010 Apr. 10, 2015 (Apr. 10, 2015), c Retrieved from the Internet: URL:http://www.3gpp.org/ftp/tsg_ran/WG2_RL2/TSGR2 89bis/Docs/ [retrieved on Apr. 10, 2015].
(Continued)

*Primary Examiner* — David Q Nguyen
(74) *Attorney, Agent, or Firm* — Arent Fox, LLP

(57) ABSTRACT

Techniques for uplink transmission management in a wireless communications system are described herein. An example method may include receiving an explicit uplink grant that indicates one or more implicit uplink grants. In an aspect, the example method may include performing a first clear channel assessment (CCA) in response to the explicit uplink grant in a first time slot. In another aspect, the example method may include, if the first CCA fails, sequentially performing one or more additional CCAs respectively in one or more time slots subsequent to the first time slot in response to the one or more implicit uplink grants, and transmitting the PDU over the unlicensed or shared spectrum and in a time slot subsequent to the time slot in which one of the one or more additional CCAs succeeds.

22 Claims, 13 Drawing Sheets

Related U.S. Application Data

(60) Provisional application No. 62/161,839, filed on May 14, 2015.

(51) Int. Cl.
  *H04W 72/12* (2009.01)
  *H04W 74/00* (2009.01)
  *H04L 1/18* (2006.01)
  *H04W 74/04* (2009.01)
  *H04W 16/14* (2009.01)

(52) U.S. Cl.
  CPC ......... *H04W 74/004* (2013.01); *H04W 74/04* (2013.01); *H04W 16/14* (2013.01)

(56) References Cited

U.S. PATENT DOCUMENTS

| | | |
|---|---|---|
| 2011/0085509 A1 | 4/2011 | Park et al. |
| 2011/0261763 A1 | 10/2011 | Chun et al. |
| 2014/0036853 A1 | 2/2014 | Kim et al. |
| 2014/0098768 A1 | 4/2014 | Zhang et al. |
| 2014/0307567 A1* | 10/2014 | Li ................ H04L 1/1812 370/252 |
| 2014/0307652 A1* | 10/2014 | Zhang ............ H04W 52/325 370/329 |
| 2015/0085797 A1 | 3/2015 | Ji et al. |
| 2016/0100433 A1 | 4/2016 | Vajapeyam et al. |
| 2016/0142920 A1 | 5/2016 | Suzuki et al. |
| 2016/0143014 A1* | 5/2016 | Mukherjee ........ H04W 74/0816 370/330 |
| 2016/0233989 A1 | 8/2016 | Belghoul et al. |
| 2016/0338096 A1 | 11/2016 | Vajapeyam et al. |
| 2016/0338097 A1 | 11/2016 | Andreoli-Fang et al. |
| 2017/0230986 A1 | 8/2017 | Moon et al. |
| 2018/0048498 A1* | 2/2018 | Stern-Berkowitz ........................ H04L 5/0048 |
| 2018/0054784 A1 | 2/2018 | Yi et al. |
| 2018/0124749 A1 | 5/2018 | Park et al. |
| 2019/0150185 A1 | 5/2019 | Vajapeyam et al. |

OTHER PUBLICATIONS

ETRI: "Discussion on UL Grant for LAA", 3GPP Draft, R1-152095, 3rd Generation Partnership Project (3GPP), Mobile Competence Centre, 650, Route Des Lucioles, F-06921 Sophia-Antipolis Cedex, France, vol. RAN WG1, No. Belgrade, Serbia, Apr. 20, 2015-Apr. 24, 2015 Apr. 19, 2015 (Apr. 19, 2015), XP050934943, pp. 5, Retrieved from the Internet: URL: http://www.3gpp.org/ftp/Meetings_3GPP_SYNC/RAN1/Docs/ [retrieved on Apr. 19, 2015] paragraph [0002], figure 2.

ETRI: "Discussion on UL HARQ operation for LAA," 3GPP Draft; R1-152097—Discussion on UI HARQ Operation for LAA, 3rd Generation Partnership Project (3GPP), Mobile Competence Centre ; 650, Route Des Lucioles ; F-06921 Sophia-Antipolis Cedex ; France vol. RAN WG1, No. Belgrade, Serbia; Apr. 20, 2015-Apr. 24, 2015 Apr. 10, 2015 (Apr. 10, 2015), XP050949706, Retrieved from the Internet: URL:http://www.3gpp.org/ftp/tsg_ran/WG1_RL1/TSGR180b/Docs/ [retrieved on Apr. 10, 2015].

HTC: "Discussion on HARQ for LAA-LTE," 3GPP Draft; R1-150525, 3rd Generation Partnership Project (3GPP), Mobile Competence Centre ; 650, Route Des Lucioles ; F-06921 Sophia-Antipolis Cedex ; France vol. RAN WG1, No. Athens, Greece; Feb. 9, 2015-Feb. 13, 2015 Jan. 31, 2015 (Jan. 31, 2015), XP050949039, Retrieved from the Internet: URL:http://www.3gpp.org/ftp/tsg_ran/WG1_RL1/TSGR1 80/Docs/ [retrieved on Jan. 31, 2015].

Intel Corporation: "RAN2 Aspects for LAA SI," 3GPP Draft; R2-150167 RAN2 Aspects on LAA V1, 3rd Generation Partnership Project (3GPP), Mobile Competence Centre ; 650, Route Des Lucioles ; F-06921 Sophia-Antipolis Cedex ; France vol. RAN WG2, No. Athens, Greece; Feb. 9, 2015-Feb. 13, 2015 Jan. 31, 2015 (Jan. 31, 2015), XP050952431, Retrieved from the Internet: URL:http://www.3gpp.org/ftp/tsg_ran/WG2_RL2/TSGR2 89/Docs/ [retrieved on Jan. 31, 2015].

International Search Report and Written Opinion—PCT/US2016/032368—ISA/EPO—dated Nov. 9, 2016.

Partial International Search Report—PCT/US2016/032368—ISA/EPO—dated Jul. 28, 2016.

\* cited by examiner

TECHNIQUES FOR UPLINK TRANSMISSION MANAGEMENT

CROSS-REFERENCE TO RELATED APPLICATION

The present application is a Continuation of U.S. patent application Ser. No. 15/153,656, entitled "TECHNIQUES FOR UPLINK TRANSMISSION MANAGEMENT," filed May 12, 2016, which claims the benefit of U.S. Provisional Application Ser. No. 62/161,839, entitled "TECHNIQUES FOR UPLINK TRANSMISSION MANAGEMENT," filed May 14, 2015, the contents of which are both incorporated by reference in their entireties.

BACKGROUND

The described aspects relate generally to wireless communication systems. More particularly, the described aspects relate to techniques for uplink transmission management in wireless communications.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, single-carrier frequency division multiple access (SC-FDMA) systems, time division synchronous code division multiple access (TD-SCDMA) systems, and orthogonal frequency division multiple access (OFDMA) systems.

These multiple-access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

By way of example, a wireless multiple-access communications system may include a number of base stations, each simultaneously supporting communication for multiple communication devices, which may be otherwise known as user equipment (UEs), wireless devices, mobile devices or stations (STAs). A base station may communicate with the communication devices on downlink channels (e.g., for transmissions from a base station to a UE) and uplink channels (e.g., for transmissions from a UE to a base station).

As cellular networks have become more congested, operators are beginning to look at ways to maximize the use of available network resources. One approach may include utilizing an unlicensed or shared spectrum (e.g., 5 Giga Hertz (GHz) band) to schedule traffic between the base station and the one or more communication devices. As referenced herein, a wireless communications system that adapts LTE air interface to operate in unlicensed or shared spectrum may be referred to as an LTE-U system or a license-assisted access (LAA) system. The unlicensed spectrum may be employed by cellular systems in different ways. For example, in some systems, the unlicensed spectrum may be employed in a standalone configuration, with all carriers operating exclusively in an unlicensed portion of the wireless spectrum (e.g., LTE Standalone). In other systems, the unlicensed spectrum may be employed in a manner that is supplemental to licensed band operation by utilizing one or more unlicensed carriers operating in the unlicensed portion of the wireless spectrum in conjunction with an anchor licensed carrier operating in the licensed portion of the wireless spectrum (e.g., LTE Supplemental DownLink (SDL)).

Due to respective requirements regarding operations in licensed spectrum and unlicensed or shared spectrum, uplink transmissions are generally subject to a listen-before-talk (LBT) approach. That is, when a communication device (e.g., UE or STA) has uplink data for transmission, the communication device may perform a channel check (e.g., clear channel assessment (CCA) or extended clear channel assessment (eCCA)) prior to transmitting any data on the uplink channel. If the result of the channel check indicates that a channel is available for the uplink transmission, i.e., the channel is clear for use and the channel check succeeds, the communication device may then accordingly transmit uplink data. However, if the result of the channel check indicates that the channel is unavailable for the uplink transmission, i.e., the channel is currently busy and the channel check fails, the communication device typically may have to wait until some later time resulting in uplink transmission delays. Other aspects of operations in licensed spectrum and unlicensed or shared spectrum that may cause delays in uplink transmissions are related to the use of hybrid automatic repeat request (HARD) operations.

Therefore, there is a need to provide mechanisms for uplink transmission management that are suitable for wireless communications in an unlicensed or shared spectrum.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents examples of techniques for configuring a window size. In an aspect of the disclosure, an example method for managing uplink transmissions in a license-assisted access (LAA) system may include receiving an explicit uplink grant that indicates one or more implicit uplink grants. In another aspect, the example method may include performing a first clear channel assessment (CCA) in response to the explicit uplink grant in a first time slot. In an aspect, the example method may include, if the first CCA succeeds, transmitting a protocol data unit (PDU) over an unlicensed or shared spectrum and in a time slot subsequent to the first time slot. In another aspect, the example method may include, if the first CCA fails, sequentially performing one or more additional CCAs respectively in one or more time slots subsequent to the first time slot in response to the one or more implicit uplink grants.

In another aspect, an example method for managing uplink transmissions in an LAA system may include receiving an explicit uplink grant that indicates one or more implicit uplink grants. In an aspect, the example method may include performing a first clear channel assessment (CCA) in response to the explicit uplink grant in a first time slot. In another aspect, the example method may include, if the first CCA succeeds, respectively transmitting over an unlicensed or shared spectrum copies of a protocol data unit (PDU) in time slots immediately subsequent to the first time slot, wherein a number of transmitted copies of the PDU is based at least in part on the one or more implicit uplink grants.

In an aspect, an example method for managing uplink transmissions in an LAA system may include receiving a first explicit uplink grant for transmission of a first protocol data unit (PDU) associated with a first Hybrid Automatic Repeat Request (HARQ) process and receiving a second explicit uplink grant for transmission of a second PDU associated with a second HARQ process, the second explicit uplink grant being received subsequent to the first explicit uplink grant. In another aspect, the example method may include performing a first clear channel assessment (CCA) in response to the first explicit uplink grant in a first time slot and performing a second CCA in response to the second explicit uplink grant in a second time slot. In another aspect, the example method may include, if the first CCA fails and the second CCA succeeds, determining whether to transmit over an unlicensed or shared spectrum the first PDU or the second PDU in a time slot subsequent to the second time slot in association with the second HARQ process.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
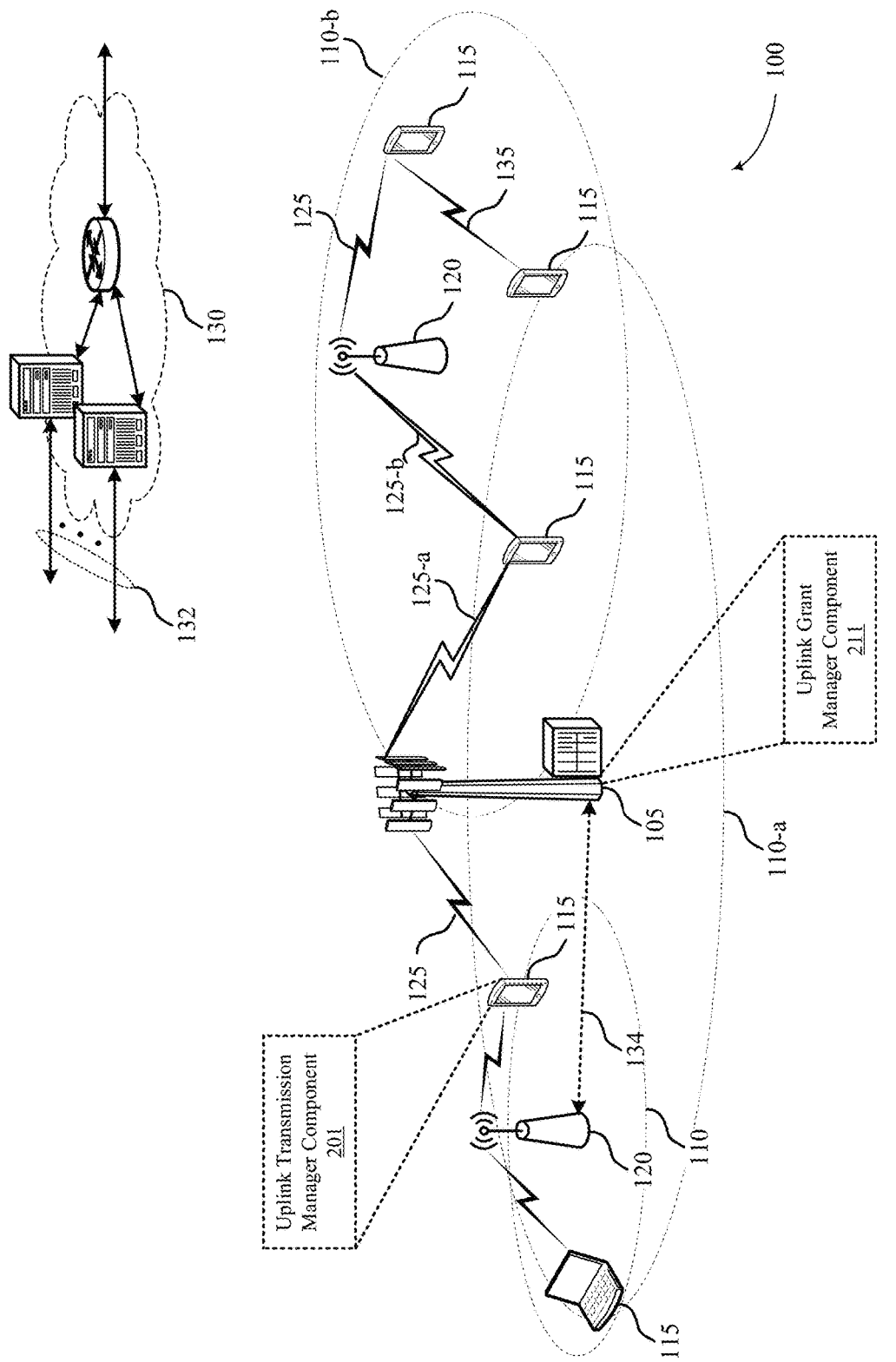
FIG. 1 is a diagram illustrating an example of a wireless communication system in which uplink transmission management may be performed.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As discussed above, congestion on the traditional licensed band (e.g., 2.4 GHz band) has motivated network operators to offload wireless wide area network (WWAN) traffic to the unlicensed or shared spectrum (e.g., 5 GHz band) in order to meet the ever-growing bandwidth demands. In LTE systems over unlicensed spectrum (LTE-U) or LAA systems, uplink transmissions from a UE to a network entity (e.g., eNodeB) are subject to listen-before-talk (LBT) principle. In an aspect, the UE may have to perform a channel check before transmitting data on the uplink channel. When the channel check fails, unnecessary delays may occur since the UE may have to wait for a subsequent uplink grant for transmitting the data. In some other examples, the data transmitted on the uplink data may be out of order.

Thus, in one aspect, a network entity may be configured to include, indicate, or specify one or more implicit uplink grants in an explicit uplink grant. That is, when a UE receives the explicit uplink grant and a first channel check fails, the UE may perform another channel check as if the UE received more than one explicit uplink grant. As referenced herein, a channel check may refer to an operation to determine if a channel is available for transmitting data. As such, the UE may not have to wait for the network entity to transmit another explicit uplink grant several time slots later that may cause delays in uplink transmissions. Further, in another aspect, when the UE receives the explicit uplink grant with the implicit uplink grants includes therein, the UE may be configured to transmit one or more copies of the data (e.g., transmit copies with different redundancy information) on the uplink such that the delay caused by possible retransmission may be mitigated.

In another aspect, when a first data unit, such as a protocol data unit (PDU) is blocked from being transmitted (e.g., transmission of the PDU does not occur) due to a failed channel check, the UE may be configured to transmit the first PDU when the UE receives a subsequent uplink grant for a second PDU. As such, a first PDU in time may be transmitted before other PDUs.

FIG. 1 illustrates an example of a wireless communications system 100 in which techniques for uplink transmission management may be performed in accordance with various aspects of the present disclosure. The wireless communications system 100 includes base stations 105, small cell access points (AP) 120, mobile devices 115, and a core network 130. In some aspects of the present disclosure, the base station 105 may be referred to as a macro cell base station, and AP 120 may be referred to as small cell base station. The base station 105 and the AP 120 may be generally referred to as network entities as they are configured to provide network access to the mobile devices 115. One or more mobile devices 115 may include an uplink transmission manager component 201 configured to manage uplink transmissions, as described further herein. On the other side, one or more network entities (base stations 105 by way of example) may include an uplink grant manager component 211 configured to generate or manage explicit uplink grant, or implicit uplink grant, or both. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 and AP 120 may perform radio configuration and scheduling for communication with the mobile devices 115, or may operate under the control of a base station controller (not shown). In various examples, the base station 105 and AP 120 may communicate, either directly or indirectly (e.g., through core network 130), with each other over backhaul links 134 (e.g., X2, Over-the-air (OTA) etc.), which may be wired or wireless communication links. In some aspects of the present disclosure, the base station 105 and AP 120 may share their respective timing parameters associated with communication scheduling.

The base station 105 and AP 120 may wirelessly communicate with the mobile device 115 via one or more antennas. Each of the base station 105 and AP 120 may provide communication coverage for a respective geographic coverage area 110. In some examples, base station 105 may be referred to as a base transceiver station, a radio base station, an access point, a radio transceiver, a NodeB, eNodeB (eNB), Home NodeB, a Home eNodeB, or some other suitable terminology. The geographic coverage area 110-a for a base station 105 and coverage area 110-b for AP 120 may be divided into sectors making up only a portion of the coverage area (not shown). The wireless communications system 100 may include base station 105 and AP 120 of different types (e.g., macro or small cell base stations). There may be overlapping geographic coverage areas 110 for different technologies.

While the mobile devices 115 may communicate with each other through the base station 105 and AP 120 using communication links 125, each mobile device 115 may also communicate directly with one or more other mobile devices 115 via a direct wireless link 135. Two or more mobile devices 115 may communicate via a direct wireless link 135 when both mobile devices 115 are in the geographic coverage area 110 or when one or more mobile devices 115 are within the AP geographic coverage area 110-b. Examples of direct wireless link 135 may include Wi-Fi Direct connections, connections established using a Wi-Fi Tunneled Direct Link Setup (TDLS) link, and other P2P group connections. In other implementations, other peer-to-peer connections or ad hoc networks may be implemented within the wireless communications system 100.

In some examples, the wireless communications system 100 includes a wireless wide area network (WWAN) such as an LTE/LTE-Advanced (LTE-A) network. WWAN technologies such as LTE or LTE-A may be adapted for operation over an unlicensed or shared spectrum. In LTE/LTE-A networks, the term evolved node B (eNB) may be generally used to describe the base stations 105, while the term user equipment (UEs) or wireless devices may be generally used to describe the mobile devices 115. The wireless communications system 100 may include a heterogeneous LTE/LTE-A network in which different types of eNBs provide coverage for various geographical regions. The wireless communications system 100 may also support eCC operations, which may use listen-before-talk (LBT) like LTE over unlicensed spectrum, but may have a different numerology than LTE over unlicensed spectrum.

The wireless communications system 100 may, in some examples, also support a wireless local area network (WLAN). A WLAN may be a network employing techniques based on the Institute of Electrical and Electronics Engineers (IEEE) 802.11x family of standards ("Wi-Fi"). In some examples, each eNB or base station 105 and AP 120 may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by mobile device 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by mobile device 115 with service subscriptions with the network provider. A femto cell may also cover a small geographic area (e.g., a home) and may provide restricted access by mobile device 115 having an association with the femto cell (e.g., mobile device 115 in a closed subscriber group (CSG), mobile device 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). In some aspects of the present disclosure, the base station 105 may be referred to as a macro cell base station, and AP 120 may be referred to as small cell base station.

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a mobile device 115 and the base stations 105. The RRC protocol layer may also be used for core network 130 support of radio bearers for the user plane data. At the physical (PHY) layer, the transport channels may be mapped to physical channels.

The mobile devices 115 may be dispersed throughout the wireless communications system 100, and each mobile device 115 may be stationary or mobile. A mobile device 115 may also include or be referred to by those skilled in the art as a user equipment (UE), mobile station, a subscriber station, STA, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless modem, a wireless communication device, a handheld device, a tablet computer, a laptop computer, a cordless phone, a wireless local loop (WLL) station, or the like. A mobile device may be able to communicate with various types of base stations and network equipment including macro eNBs, small cell eNBs, relay base stations, and the like. In some examples, a dual-radio UE 115-a, may include a WLAN radio (not shown) and a WWAN radio (not shown) that may be configured to concurrently communicate with base station 105 (using the WWAN radio) and with AP 120 (using the WLAN radio).

The communication links 125 shown in wireless communications system 100 may include uplink (UL) transmissions from a mobile device 115 to a base station 105 or AP 120, or downlink (DL) transmissions, from a base station 105 or AP 120 to a mobile device 115. The downlink transmissions may also be called forward link transmissions while the uplink transmissions may also be called reverse link transmissions. Each communication links 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The communication links 125 may utilize resources of licensed spectrum or unlicensed spectrum, or both. Broadly speaking, the unlicensed spectrum in some jurisdictions may range from 600 Megahertz (MHz) to 6 Gigahertz (GHz), but need not be limited to that range. As used herein, the term "unlicensed spectrum" or "shared spectrum" may thus refer to industrial, scientific and medical (ISM) radio bands, irrespective of the frequency of those bands. An "unlicensed spectrum" or "shared spectrum" may refer to a spectrum used in a contention-based communications system. In addition, the term "licensed spectrum" or "cellular spectrum" may be used herein to refer to wireless spectrum utilized by wireless network operators under administrative license from a governing agency.

Wireless communications system 100 may also support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A mobile device 115 may be configured with multiple downlink CCs and one or more uplink CCs for carrier aggregation. Carrier aggregation may be used with both FDD and TDD component carriers.

Figure 2A:
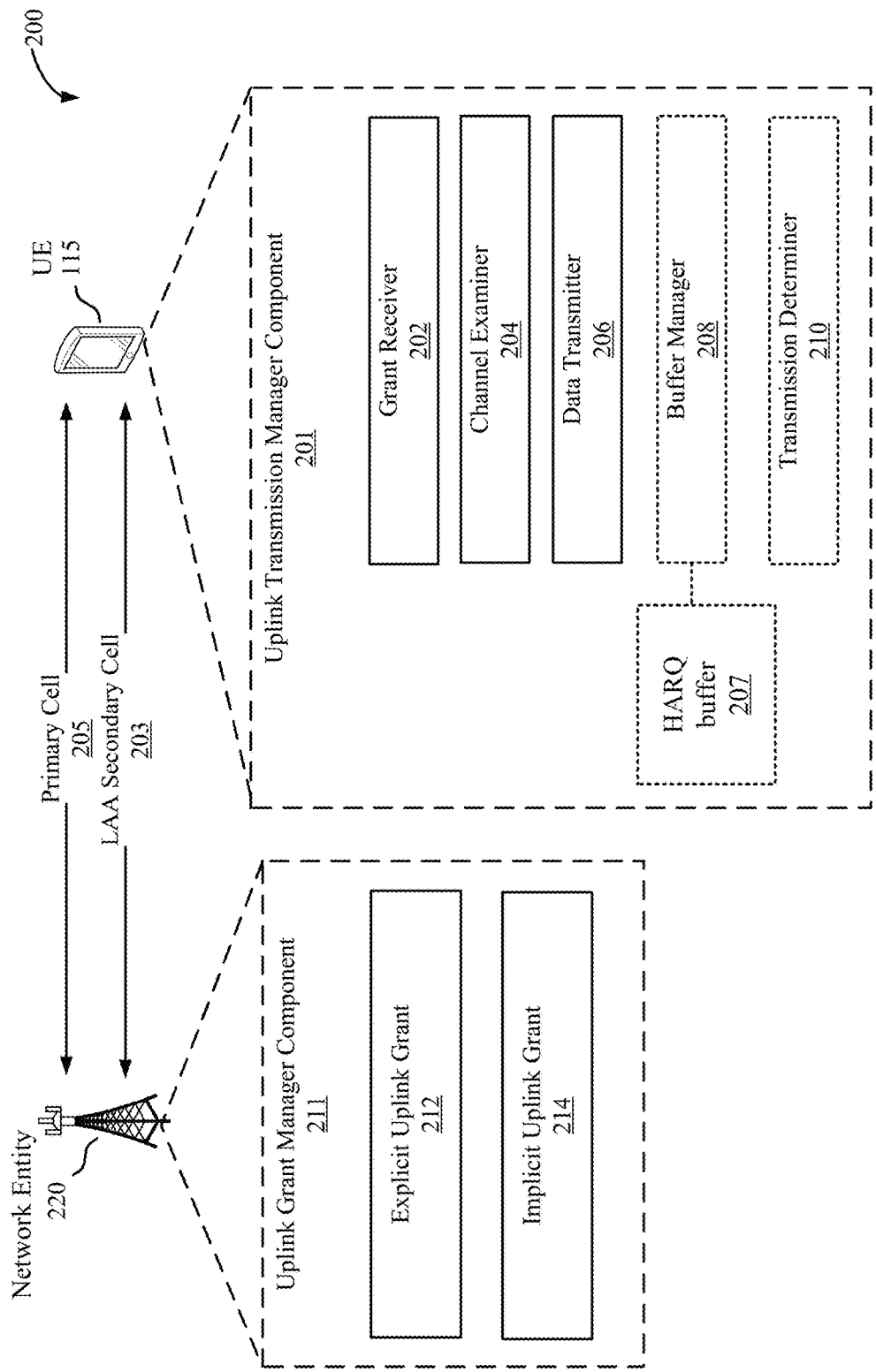
FIG. 2A is a diagram illustrating an example of components of the wireless communication system for uplink grant and transmission management.

FIG. 2A is a diagram illustrating example components of the wireless communication system for uplink grant and transmission management. As depicted, UE 115 may be in communication with a network entity 220 associated with core network 130 via a primary cell 205 and/or an LAA secondary cell 203. In some examples, network entity 220 may be referred to as a base station, a base transceiver station, an access point, a radio transceiver, a NodeB, eNodeB (eNB), Home NodeB, a Home eNodeB, or some other suitable terminology. In some aspects, primary cell 205 may refer to connectivity services provided in a licensed spectrum and LAA secondary cell 203 may refer to connectivity services provided in an unlicensed spectrum. UE 115 may receive signaling, including uplink grants, via primary cell 205 and transmit data (e.g., PDUs) via LAA secondary cell 203.

Further, UE 115 may be configured to execute an uplink transmission manager component 201 that includes a grant receiver 202, a channel examiner 204, a data transmitter 206, a buffer manager 208, and a transmission determiner 210. Network entity 220 may be configured to execute an uplink grant manager component 211 to generate an explicit uplink grant 212 and at least one implicit uplink grant 214.

In one aspect, uplink grant manager component 211 may generate explicit uplink grant 212 that indicates, when received by UE 115, UE 115 is authorized to transmit an amount of data on the uplink. Explicit uplink grant 212 may also include a maximum size of the data authorized to transmit on the uplink. In addition to generating explicit uplink grant 212, uplink grant manage process 211 may further include, or otherwise indicate, one or more implicit uplink grants 214 in explicit uplink grant 212. In other words, each of the implicit uplink grants 214 may authorize UE 115 to transmit the amount of data on the uplink. Uplink grant manager component 211 may determine a count of implicit uplink grants 214 based on factors including a total number of UEs within the coverage of wireless communications system 100.

In another aspect, when explicit uplink grant 212 is received by grant receiver 202 of UE 115 at a time slot n via primary cell 205, channel examiner 204 may perform a channel check prior to transmitting the data on the uplink channel. If the channel check succeeds, i.e., an uplink channel is available for transmitting the data, data transmitter 206 may transmit the data on the uplink channel via LAA secondary cell 203. If the channel check fails, i.e., the uplink channel is not available for transmitting the data, buffer manager 208 may store the data, e.g., a first PDU, in a HARQ buffer associated with a HARQ process, e.g., HARQ buffer 207. Further, transmission determiner 210 may determine which data should be transmitted if one or more PDUs have been stored in the HARQ buffer due to previous failed channel checks. Such determination may be performed based on one or more factors further described in FIG. 3. In addition, other aspects of the components of network entity 220 and UE 115 are described in details in accordance with FIG. 2B and FIG. 2C, respectively.

Figure 2B:
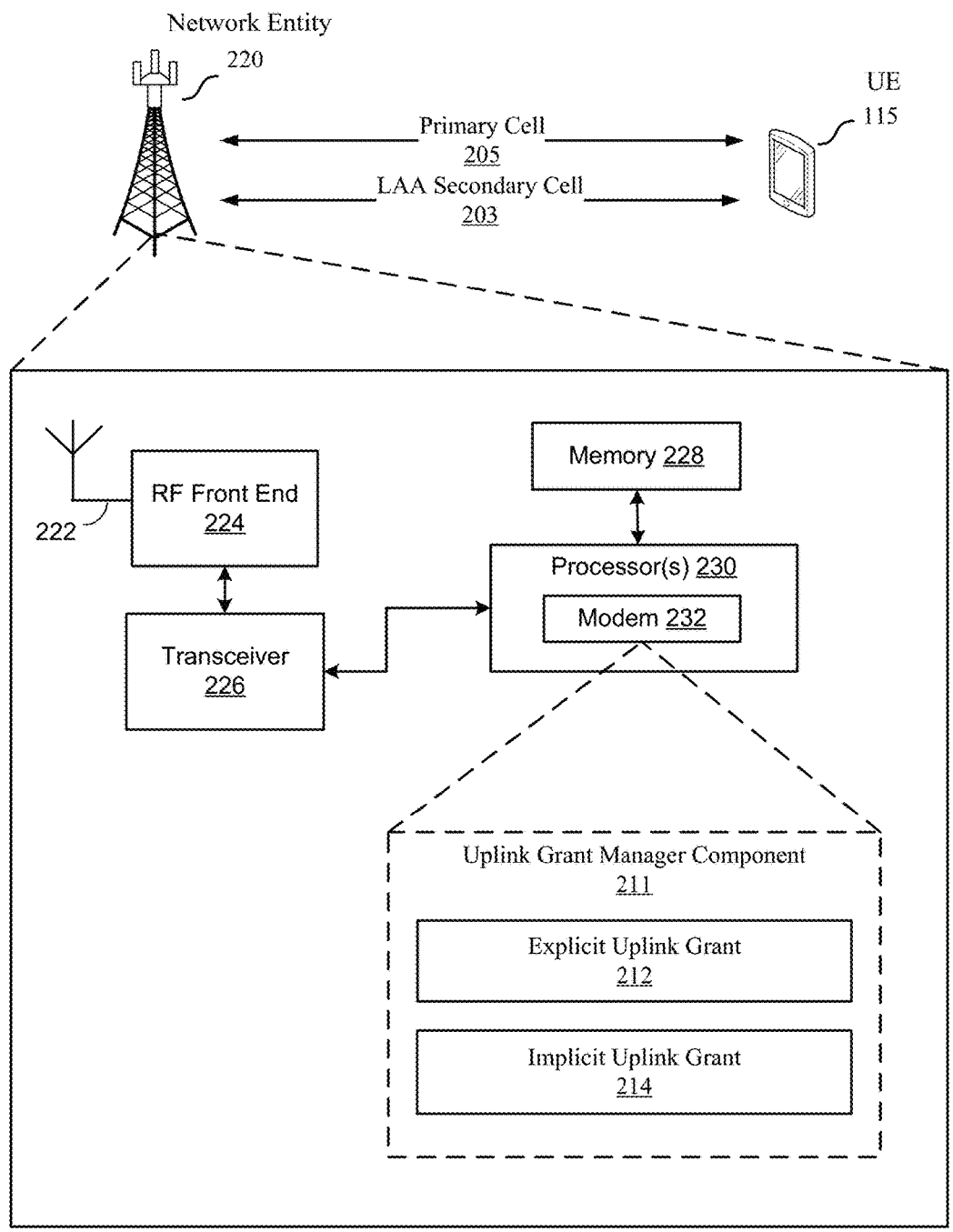
FIG. 2B is a diagram illustrating an example of components of a network entity (e.g., base station or access point) in the wireless communication system for uplink grant management.

Referring to FIG. 2B, in an aspect, a network entity 220 (e.g., a base station or an access point) associated with core network 130 may be in communication with UE 115 via a primary cell 205 and/or an LAA secondary cell 203. In some aspects, primary cell 205 may refer to connectivity services provided in a licensed spectrum and LAA secondary cell 203 may refer to connectivity services provided in an unlicensed spectrum. Network entity 220 may transmit signaling, including uplink grants, via primary cell 205 and receive data (e.g., PDUs) via LAA secondary cell 203.

In an aspect, network entity 220 may include one or more antennas 222, RF front end 224 and transceiver 226 for receiving and transmitting radio transmissions, including, for example, the described signaling messages and also any messages corresponding to uplink grant and/or uplink transmission management. RF front end 224 may be connected to the one or more antennas 222. RF front end 224 may include, for example, one or more low-noise amplifiers (LNAs) (not shown), one or more switches (not shown), one or more power amplifiers (PAs) (not shown), and one or more filters (not shown) for transmitting and receiving RF signals on the uplink channels and downlink channels. RF front end 224 is merely an example configuration; in an aspect, other configurations for RF front end 224 may be used by network entity 220. In an aspect, components of RF front end 224 may connect with transceiver 226. Transceiver 226 may connect to one or more processor 230.

In another aspect, network entity 220 may include one or more processors 230 that may operate in combination with uplink grant manager component 211, which may generate an explicit uplink grant 212 and/or at least one implicit uplink grant 214, for uplink grant and/or uplink transmission management as described herein. In an aspect, the one or more processors 230 may include a modem 232 that uses one or more modem processors. In another aspect, the one or more processors 230 may be communicatively coupled to at least a memory 228, wherein the memory 228 may be configured to store instructions for handling uplink grant and/or uplink transmission management.

Figure 2C:
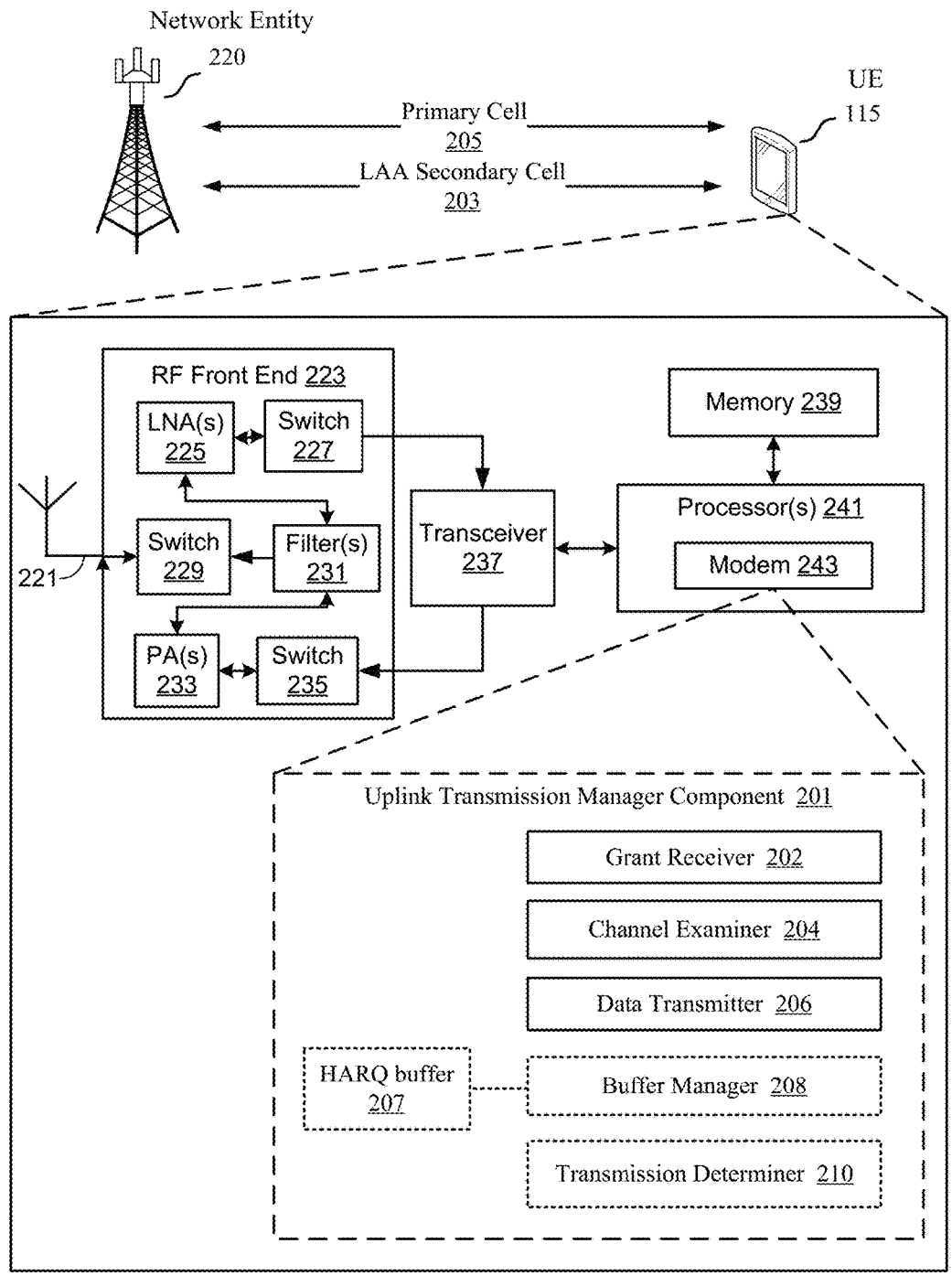
FIG. 2C is a diagram illustrating an example of components of a mobile device (e.g., user equipment) in the wireless communication system for uplink transmission management.

Referring to FIG. 2C, in an aspect, an UE 115 may be in communication with a network entity 220 associated with core network 130 via a primary cell 205 and/or an LAA secondary cell 203. In some aspects, primary cell 205 may refer to connectivity services provided in a licensed spectrum and LAA secondary cell 203 may refer to connectivity services provided in an unlicensed spectrum. UE 115 may receive signaling, including uplink grants, via primary cell 205, and transmit data (e.g., PDUs) via LAA secondary cell 203.

In an aspect, UE 115 may include RF front end 223 and transceiver 237 for receiving and transmitting radio transmissions, including, for example, the described signaling messages and also any messages corresponding to the operation of uplink transmission manager component 201. RF front end 223 may be connected to one or more antennas 221. RF front end 223 may include, for example, one or more low-noise amplifiers (LNAs) 225, one or more switches 227, 229, 235, one or more power amplifiers (PAs) 233, and one or more filters 231 for transmitting and receiving RF signals. RF front end 223 is merely an example configuration; in an aspect, other configurations for RF front end 223 may be used by UE 115. In an aspect, components of RF front end 223 may connect with transceiver 237. Transceiver 237 may connect to one or more processor 241.

In an aspect, LNA 225 may amplify a received signal at a desired output level. In an aspect, each LNA 225 may have a specified minimum and maximum gain values. In an aspect, RF front end 223 may use one or more switches 227, 229 to select a particular LNA 225 and its specified gain value based on a desired gain value for a particular application.

Further, for example, one or more PA(s) 233 may be used by RF front end 223 to amplify a signal for an RF output at a desired output power level. In an aspect, each PA 233 may have a specified minimum and maximum gain values. In an aspect, RF front end 223 may use one or more switches 229, 235 to select a particular PA 233 and its specified gain value based on a desired gain value for a particular application.

Also, for example, one or more filters 231 may be used by RF front end 223 to filter a received signal to obtain an input RF signal. Similarly, in an aspect, for example, a respective filter 231 may be used to filter an output from a respective PA 233 to produce an output signal for transmission. In an aspect, each filter 231 may be connected to a specific LNA 225 and/or PA 233. In an aspect, RF front end 223 may use one or more switches 227, 229, 235 to select a transmit or receive path using a specified filter 231, LNA 225, and/or PA 233, based on a configuration as specified by transceiver 237 and/or processor 241.

In an aspect, UE 115 may include one or more processors 241 that may operate in combination with an uplink transmission manager component 201 for managing uplink transmissions as described herein. In an aspect, uplink transmission manager component 201 may include a grant receiver 202, a channel examiner 204, a data transmitter 206, a buffer manager 208, and a transmission determiner 210. In another aspect, buffer manager 208 may be associated with one or more HARQ buffers 207. In an aspect, the one or more processors 241 may include a modem 243 that uses one or more modem processors. In another aspect, the one or more processors 241 may be communicatively coupled to at least a memory 239, wherein the memory 239 may be configured to store instructions for handling uplink transmission management.

Various functions related to uplink transmission manager component 201 may be included in modem 243 and/or one or more processors 241 and, in an aspect, may be executed by a single processor, while in other aspects, different ones of the functions may be executed by a combination of two or more different processors. For example, in an aspect, the one or more processors 241 may include any one or any combination of a modem processor, or a baseband processor, or a digital signal processor, or a transmit processor, or a transceiver processor associated with transceiver 237. In particular, the one or more processors 241 may execute functions included in uplink transmission manager component 201, including, but not limited to, a grant receiver 202, a channel examiner 204, a data transmitter 206, a buffer manager 208, and a transmission determiner 210. In an aspect, buffer manager 208 may be associated with one or more HARQ buffers 207. In addition, some other aspects of the components of uplink transmission manager component 201 are described in greater details in accordance with FIG. 4A, FIG. 4B, FIG. 5A, FIG. 5B, and FIG. 6.

Figure 3:
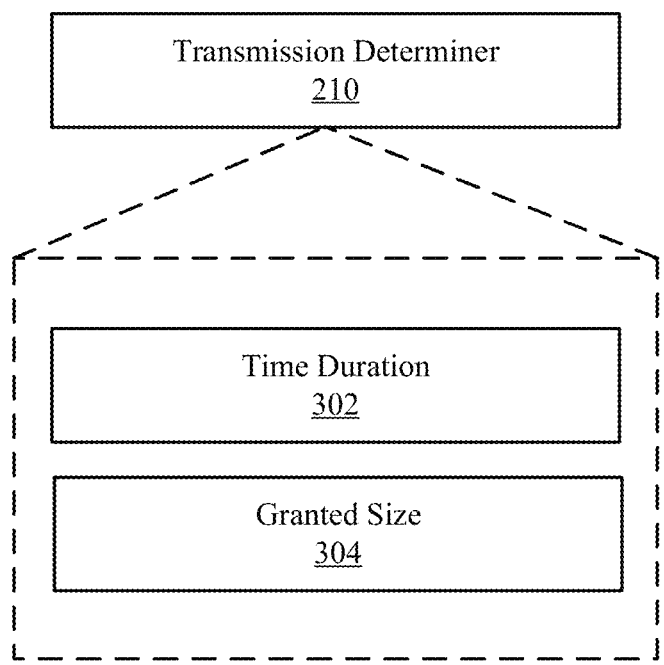
FIG. 3 is a diagram illustrating an example of subcomponents of the wireless communication system for uplink transmission management.
Figure 4:
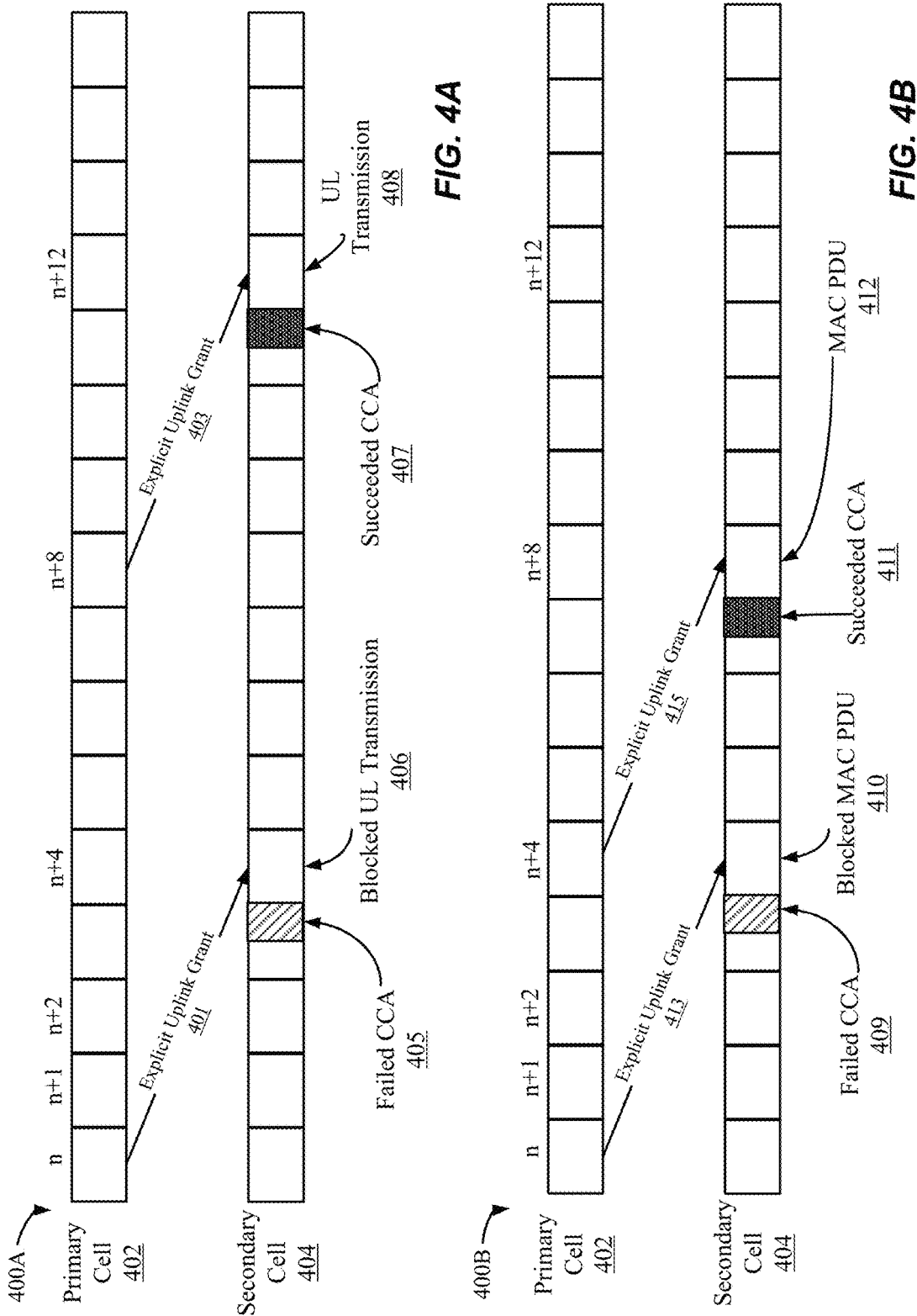
FIG. 4A is a diagram illustrating an example of conventional operations regarding uplink transmissions.
FIG. 4B is a diagram illustrating another example of conventional operations regarding uplink transmissions.
Figure 5:
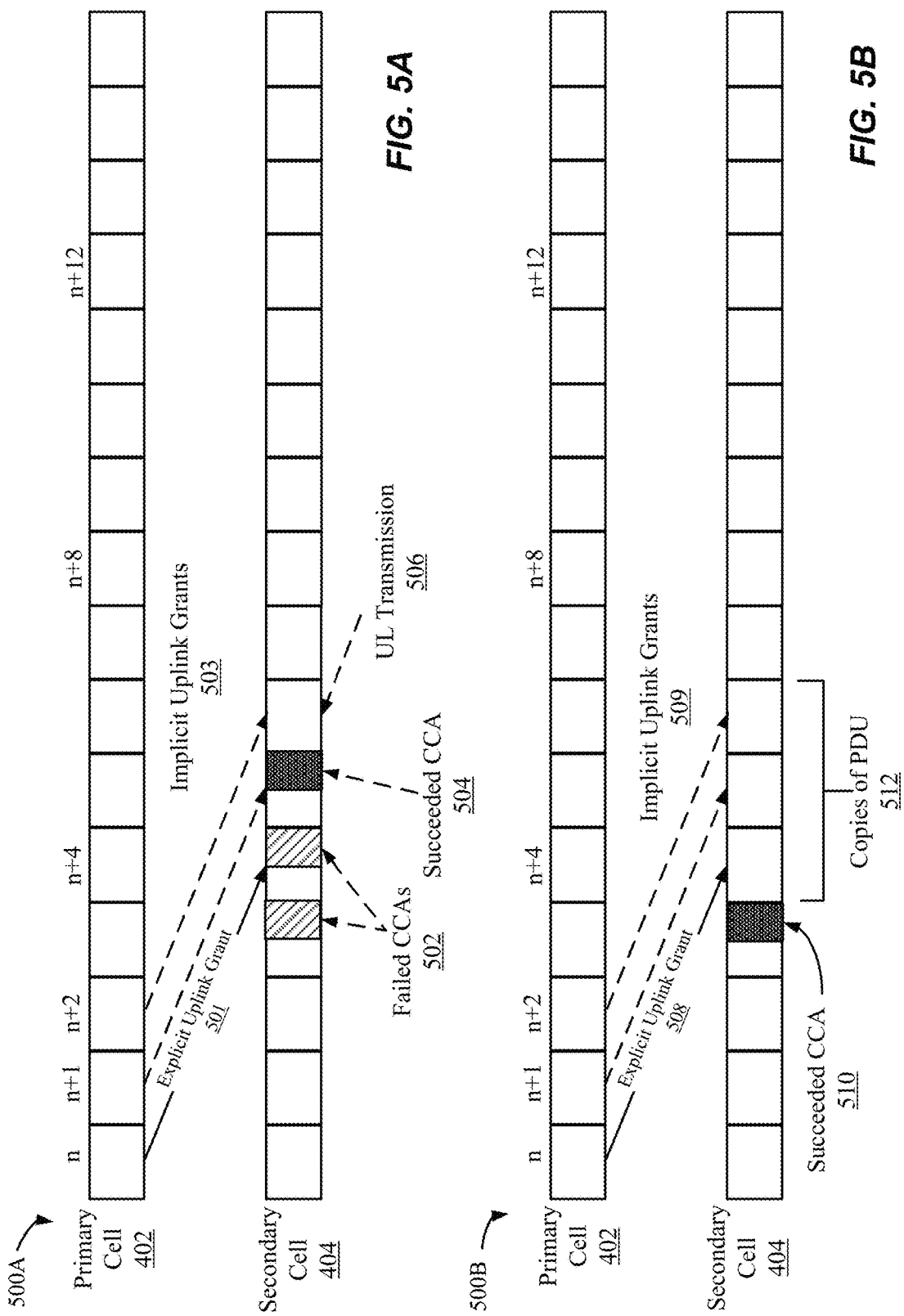
FIG. 5A, is a diagram illustrating an example of operations of uplink transmission management.
FIG. 5B is a diagram illustrating another example of operations of uplink transmission management.

FIG. 3 is a diagram illustrating example sub-components of the wireless communication system for uplink transmission management. As depicted, transmission determiner 210 may determine which data to be transmitted on the uplink channel based on time duration 302 and granted size 304.

As referenced herein, time duration 302 may refer to a time period between two consecutive explicit uplink grant. Granted size 304 may refer to a size limit indicating a maximum size of data that may be transmitted on the uplink channel in response to an explicit uplink grant. Other aspects of the sub-components of transmission determiner 210 are described in greater details in accordance with FIG. 4A, FIG. 4B, FIG. 5A, FIG. 5B, and FIG. 6.

FIG. 4A is a diagram illustrating an example of conventional operations regarding uplink transmissions. FIG. 4B is a diagram illustrating another example of conventional operations regarding uplink transmissions. For brevity, uplink transmissions are illustrated to occur immediately subsequent to a succeeded channel check.

For FIG. 4A, a first issue is that the uplink data transmission is delayed due to a failed channel check. As depicted in FIG. 4A, conventionally, when grant receiver 202 receives explicit uplink grant 401 at a time slot n, channel examiner 204 may perform a channel check prior to transmitting the data. If the channel check fails, e.g., shown as failed CCA 405, data transmitter 206 may not transmit the data on the uplink channel, e.g., shown as blocked UL transmission 406, at time slot n+4 or any other predetermined time slot. Thus, uplink transmission manager component 201 may have to wait for another explicit uplink grant 212 from network entity 220 to transmit the blocked data. For example, when grant receiver 202 receives another explicit uplink grant 403 at time slot n+8, channel examiner 204 may perform another channel check prior to transmitting the data. If the channel check succeeds, e.g., shown as succeeded CCA 407, data transmitter 206 may transmit the data, shown as UL transmission 408, at time slot n+12.

For FIG. 4B, a second issue is that the PDUs transmitted on the uplink channel may be out of order. As depicted in FIG. 4B, conventionally, grant receiver 202 may similarly receive an explicit uplink grant 413 associated with a first HARQ process from network entity 220. Channel examiner 204 may also perform a channel check prior to transmitting the data. If the channel check fails, shown as failed CCA 409, a MAC PDU may be blocked from transmission, e.g., shown as blocked MAC PDU 410. Blocked MAC PDU 410 may be temporarily stored by buffer manager 208 in a HARQ buffer associated with the first HARQ process waiting to be transmitted in response to a further explicit uplink grant. Meanwhile, grant receiver 202 may receive another explicit uplink grant 415 associated with a second HARQ process. Channel examiner 204 may accordingly perform a channel check prior to data transmission. If the channel check succeeds, e.g., shown as succeeded CCA 411, data transmitter 206 may transmit MAC PDU 412 on the uplink channel. However, the blocked MAC PDU 410 may be a PDU that should be transmitted prior to MAC PDU 412 in time and thus, network entity 220 may have to wait for blocked MAC PDU 410 to be transmitted, even when MAC PDU 412 is successfully received, and re-order MAC PDU 412 and blocked MAC PDU 410.

FIG. 5A, is a diagram illustrating an example of operations of uplink transmission management and FIG. 5B is a diagram illustrating another example of operations of uplink transmission management.

FIG. 5A provides an example approach to address the first issue illustrated in FIG. 4A. As depicted in FIG. 5A, grant receiver 202 may receive an explicit uplink grant 501, together with one or more implicit uplink grants 503 included therein (shown as two implicit uplink grants in FIG. 5A), at a time slot n. When a first channel check fails at time slot n+3 (e.g., one of failed CCAs 502), rather than waiting for another explicit uplink grant at time slot n+8, channel examiner 204 may perform one or more additional channel checks at subsequent time slots. For example, channel examiner 204 may immediately perform the additional channel checks at subsequent time slots n+4 and n+5. A count of the additional channel checks may equal the count of implicit uplink grants 503. If one of the additional channel checks succeeds, data transmitter 206 may subsequently transmit the data on the uplink channel. For example, an additional channel check may succeed at time slot n+5 (shown as succeeded CCA 504), data transmitter 206 may accordingly transmit the data on the uplink channel at time slot n+6 (shown as UL transmission 506). As such, UE 115 may not have to wait till later time slots, e.g., time slot n+12 as shown in FIG. 4A, to transmit the data and unnecessary delay may be mitigated.

In an aspect, if grant receiver 202 receives another explicit uplink grant while UE 115 is processing the implicit uplink grants, the explicit uplink grant may be delayed after the implicit uplink grants are processed.

Further, each of the explicit or implicit uplink grants may expire after a predetermine time duration.

FIG. 5B provides another example approach to address the first issue illustrated in FIG. 4A. As depicted in FIG. 5B, grant receiver 202 may receive an explicit uplink grant 508, together with one or more implicit uplink grants 509 included therein (shown as two implicit uplink grants in FIG. 5B), at time slot n. Channel examiner 204 may perform a channel check at time slot n+3, when the channel check succeeds (shown as succeeded CCA 510), data transmitter 206 may respectively transmit multiple copies of the data at subsequent time slots, e.g., time slots n+4, n+5, and n+6. Each copy of the data may be a version of different redundancy, e.g., including different redundancy information. The count of the copies may be determined based on the count of implicit uplink grants 509 and the count of failed channel checks. For example, when grant receiver 202 receives explicit uplink grant 508 and two implicit uplink grants 509 and a first channel check in time succeeds (e.g., succeeded CCA 510), data transmitter 206 may transmit three copies of the data, each in a time slot subsequent to succeeded CCA 510. When the first channel check in time fails, channel examiner 204 may perform a second channel check in a time slot subsequent to the first channel check. In some examples, channel examiner 204 may perform a second channel check in a time slot immediately subsequent to the first channel check If the second channel check succeeds, data transmitter 206 may only transmit two copies of the data on the uplink channel.

Figure 6:
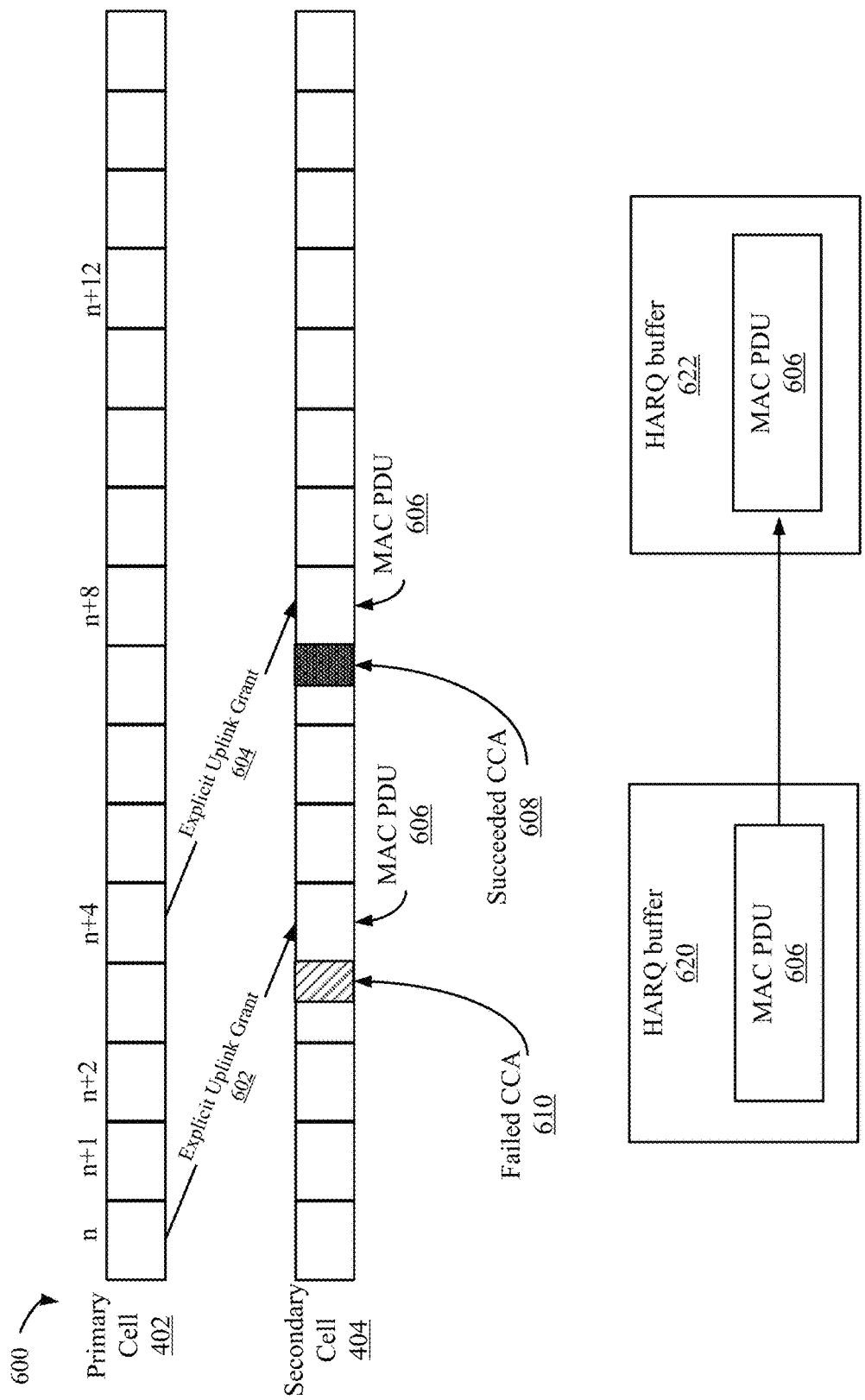
FIG. 6 is a diagram illustrating yet another example of operations of uplink transmission management.

FIG. 6 provides an example approach to address the second issue in FIG. 4B. As depicted in FIG. 6, grant receiver 202 may receive explicit uplink grant 602 at time slot n via primary cell 402. Explicit uplink grant 602 may indicate that UE 115 is authorized to transmit MAC PDU 606, MAC PDU 606 being associated with a first HARQ process. Channel examiner 204 may perform a channel check at time slot n+3. If the channel check fails (shown as failed CCA 610), MAC PDU may be blocked from being transmitted at time slot n+4 and may be stored in a buffer associated with the first HARQ process, e.g., HARQ buffer 620. Later in time, grant receiver 202 may receive, at time slot n+4, an explicit uplink grant 604 indicating that UE 115 is authorized to transmit another MAC PDU (not shown) being associated with a second HARQ process. Channel examiner 204 may similarly perform a channel check at time slot n+7. If the channel check succeeds (shown as succeeded CCA 608), transmission determiner 210 may determine whether to transmit MAC PDU 606 based on one or more factors including time duration 302, i.e., the time period between receiving explicit uplink grant 602 and 604, and granted size 304, i.e., the maximum size of data may be transmitted in accordance with explicit uplink grant 604. For example, if time duration 302 is greater than a predetermine threshold, which indicates that UE 115 has sufficient time to perform operations to retrieve MAC PDU 606, transmission determiner 210 may determine to transmit MAC PDU 606, rather than the other MAC PDU originally associated with the second HARQ process. As another example, if granted size 304 is greater than the size of MAC PDU 606, transmission determiner 210 may determine to transmit MAC PDU 606 and may be a portion of the other MAC PDU originally associated with the second HARQ process. As such, network entity 220 may receive PDUs in a correct order.

In some aspects, prior to transmitting MAC PDU 606, buffer manager 208 may move MAC PDU 606 from a HARQ buffer associated with the first HARQ process, e.g., HARQ buffer 620, to another HARQ buffer associated with the second HARQ process, e.g., HARQ buffer 622.

In another aspect, if MAC PDU 606 is successfully transmitted on the uplink channel, the buffer that stored MAC PDU 606 at UE 115 may be cleared.

Figure 7:
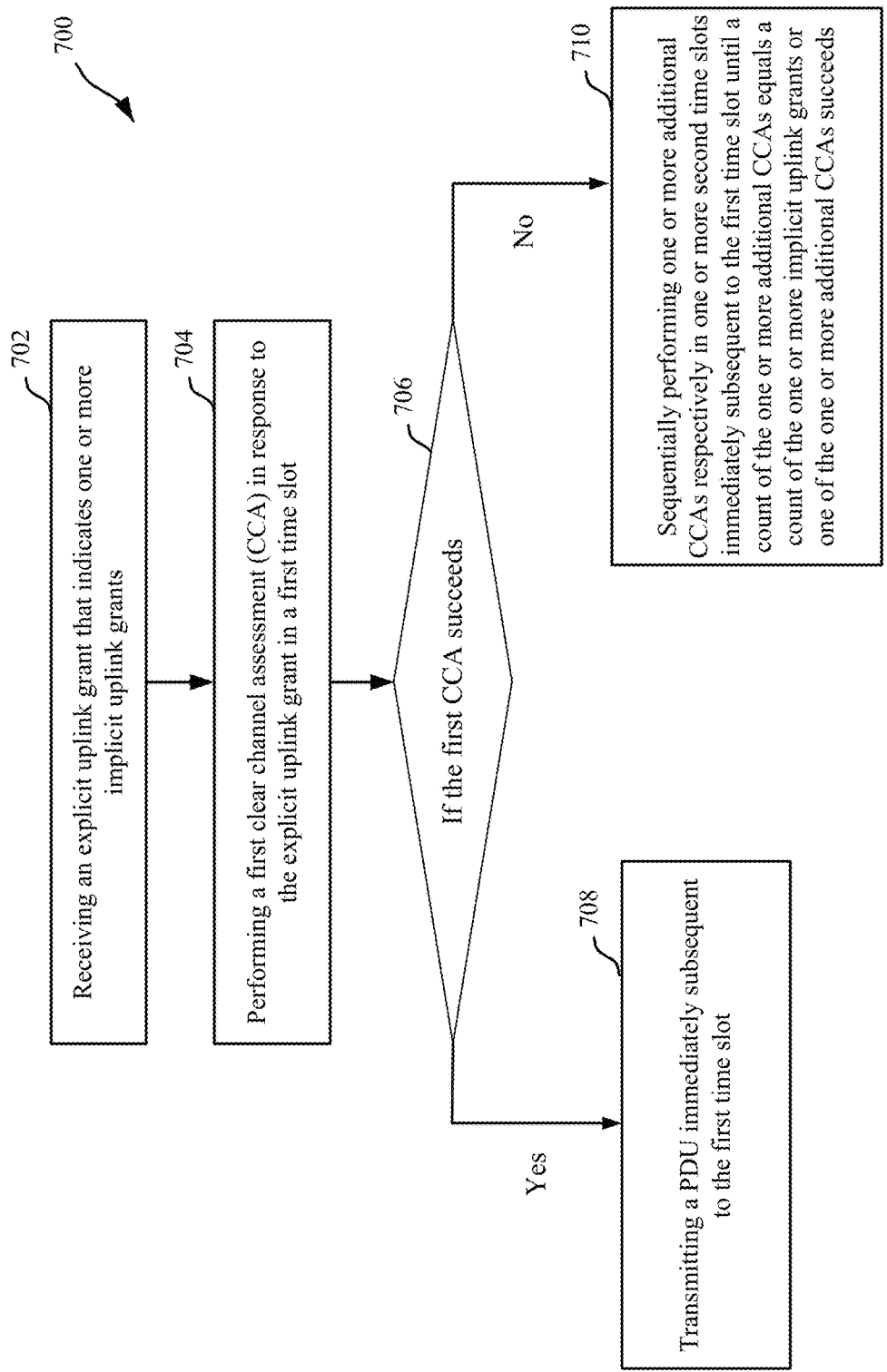
FIG. 7 is a flowchart illustrating an example of a method for uplink transmission management in an LAA system.

FIG. 7 is an example flowchart for uplink transmission management in an LAA system. Method 700 is described below with reference to ones of UEs 115 described with reference to FIGS. 1-3.

At 702, method 700 may include grant receiver 202 receiving an explicit uplink grant that indicates one or more implicit uplink grants. For example, grant receiver 202 may receive an explicit uplink grant 501, together with one or more implicit uplink grants 503 included therein (shown as two implicit uplink grants in FIG. 5A), at a time slot n.

At 704, channel examiner 204 may perform a first clear channel assessment (CCA) in response to the explicit uplink grant in a first time slot. For example, channel examiner 204 may perform a channel check at time slot n+3.

At 706, uplink transmission manager component 201 of UE 115 may determine if the first CCA succeeds.

In an aspect, when uplink transmission manager component 201 determines that the first CCA succeeds, UE 115 may proceed to 708, and data transmitter 206 may transmit a PDU over an unlicensed or shared spectrum and in a time slot subsequent to the first time slot. For example, if a channel check succeeds in time slot n+3, data transmitter 206 may immediately transmit the data in time slot n+4.

In another aspect, when uplink transmission manager component 201 determines that the first CCA does not succeed, UE 115 may proceed to 710, and channel examiner 204 may sequentially perform one or more additional CCAs respectively in one or more time slots subsequent to the first time slot in response to the one or more implicit uplink grants. For example, when a first channel check fails at time slot n+3 (e.g., one of failed CCAs 502), rather than waiting for another explicit uplink grant at time slot n+8, channel examiner 204 may perform one or more additional channel checks at time slots n+4 and n+5. A count of the additional channel checks may equal the count of implicit uplink grants 503. If one of the additional channel checks succeeds, data transmitter 206 may subsequently transmit the data on the uplink channel. For example, an additional channel check may succeed at time slot n+5 (shown as succeeded CCA 504), data transmitter 206 may accordingly transmit the data on the uplink channel at time slot n+6 (shown as UL transmission 506). As such, UE 115 may not have to wait till later time slots, e.g., time slot n+12, to transmit the data and unnecessary delay may be mitigated.

In another aspect of FIG. 7, an example apparatus for managing uplink transmissions in a license-assisted access (LAA) system is provided. In an aspect, the apparatus includes means for receiving an explicit uplink grant that indicates one or more implicit uplink grants. In an aspect, the apparatus also includes means for performing a first clear channel assessment (CCA) in response to the explicit uplink grant in a first time slot. In another aspect, the apparatus includes means for transmitting a protocol data unit (PDU) over an unlicensed or shared spectrum and in a time slot subsequent to the first time slot if the first CCA succeeds. In an aspect, the apparatus may also include means for sequentially performing, if the first CCA fails, one or more additional CCAs respectively in one or more time slots subsequent to the first time slot in response to the one or more implicit uplink grants. In another aspect, the apparatus includes means for transmitting the PDU over the unlicensed or shared spectrum and in a time slot subsequent to the time slot, if the first CCA fails, in which one of the one or more additional CCAs succeeds.

In an aspect of FIG. 7, an example computer-readable medium storing computer executable code for managing uplink transmissions in a license-assisted access (LAA) system is provided. In an aspect, the computer-readable medium includes computer executable code for receiving an explicit uplink grant that indicates one or more implicit uplink grants. In another aspect, the computer-readable medium also includes computer executable code for performing a first clear channel assessment (CCA) in response to the explicit uplink grant in a first time slot. In an aspect, the computer-readable medium includes computer executable code for transmitting a protocol data unit (PDU) over an unlicensed or shared spectrum and in a time slot subsequent to the first time slot if the first CCA succeeds. In another aspect, the computer-readable medium includes computer executable code for sequentially performing, if the first CCA fails, one or more additional CCAs respectively in one or more time slots subsequent to the first time slot in response to the one or more implicit uplink grants. In an aspect, the computer-readable medium includes computer executable code for transmitting the PDU over the unlicensed or shared spectrum and in a time slot subsequent to the time slot in which one of the one or more additional CCAs succeeds if the first CCA fails.

Still referring FIG. 7, another example apparatus for managing uplink transmissions in a license-assisted access (LAA) system is provided. In an aspect, the apparatus may include a memory configured to store instructions and at least one processor coupled to the memory, the at least one processor and the memory are configured to execute the instructions to perform the following features. In another aspect, the apparatus may include a grant receiver configured to receive an explicit uplink grant that indicates one or more implicit uplink grants. In an aspect, the apparatus may include a channel examiner configured to perform a first clear channel assessment (CCA) in response to the explicit uplink grant in a first time slot. In another aspect, the apparatus may also include a data transmitter configured to transmit a protocol data unit (PDU) over an unlicensed or shared spectrum and in a time slot subsequent to the first time slot if the first CCA succeeds. In an aspect, if the first CCA fails, the channel examiner included in the apparatus may be configured to sequentially perform one or more additional CCAs respectively in one or more time slots subsequent to the first time slot in response to the one or more implicit uplink grants. In another aspect, the data transmitter included in the apparatus may be further configured to transmit the PDU over the unlicensed or shared spectrum and in a time slot subsequent to the time slot in which one of the one or more additional CCAs succeeds.

Figure 8:
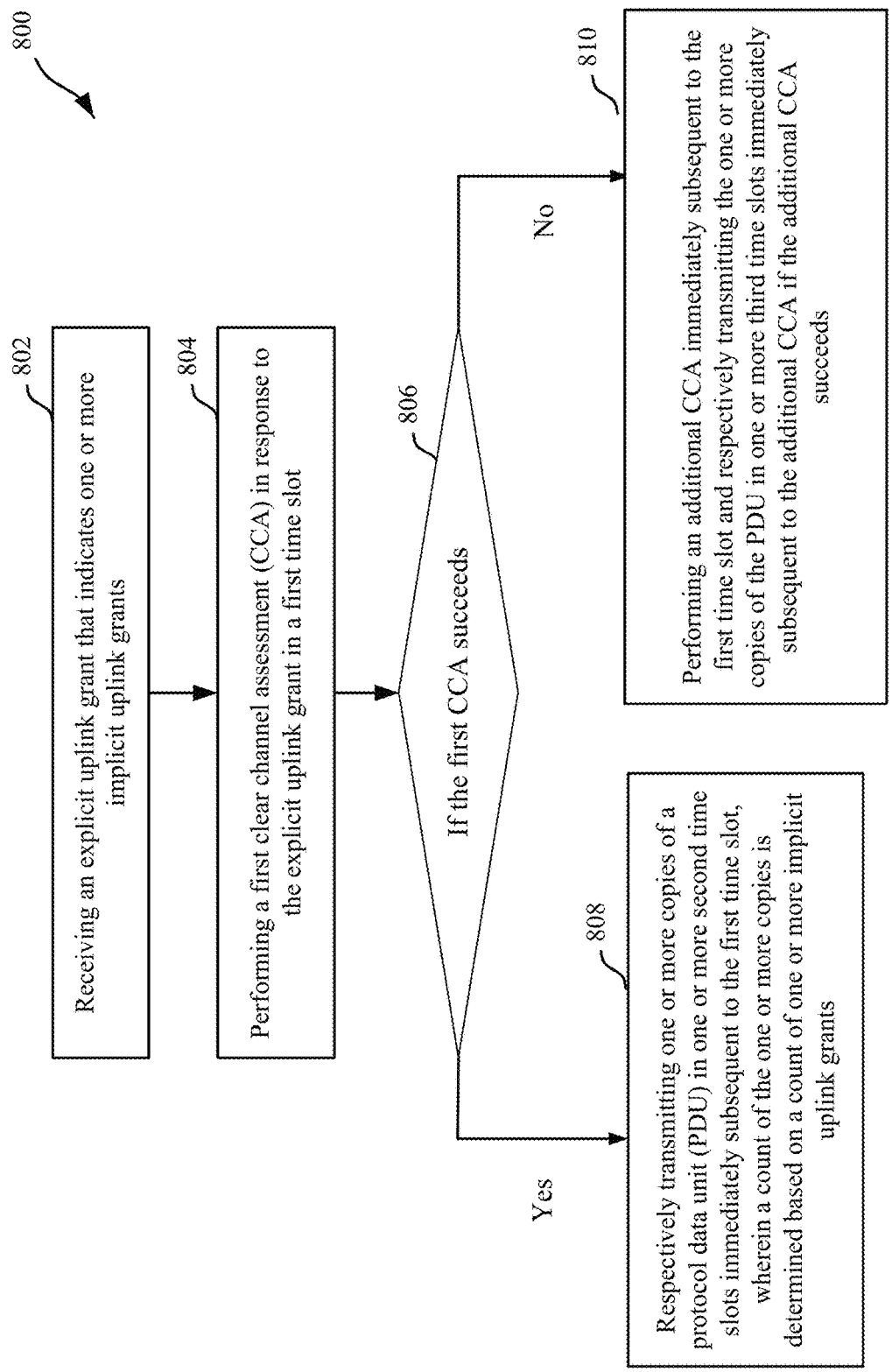
FIG. 8 is a flowchart illustrating an example of another method for uplink transmission management in an LAA system.

FIG. 8 is another example flowchart for uplink transmission management in an LAA system. Method 800 is described below with reference to ones of UEs 115 described with reference to FIGS. 1-3.

At 802, method 800 may include grant receiver 202 receiving an explicit uplink grant that indicates one or more implicit uplink grants. For example, grant receiver 202 may receive an explicit uplink grant 508, together with one or more implicit uplink grants 509 included therein (shown as two implicit uplink grants in FIG. 5B), at a time slot n.

At 804, method 800 may include channel examiner 204 performing a first clear channel assessment (CCA) in response to the explicit uplink grant in a first time slot. For example, channel examiner 204 may perform a channel check at time slot n+3.

At 806, uplink transmission manager component 201 of UE 115 may determine if the first CCA succeeds.

In an aspect, when uplink transmission manager component 201 determines that the first CCA succeeds, UE 115 may proceed to 808, data transmitter 206 may respectively transmit over an unlicensed or shared spectrum copies of a protocol data unit (PDU) in time slots subsequent to the first time slot, wherein a number of transmitted copies of the PDU is based at least in part on the one or more implicit uplink grants. For example, when the channel check succeeds (shown as succeeded CCA 510), data transmitter 206 may respectively transmit multiple copies of the data at subsequent time slots, e.g., time slots n+4, n+5, and n+6. Each copy of the data may be a version of different redundancy, e.g., including different redundancy information. The count of the copies may be determined based on the count of implicit uplink grants 509 and the count of failed channel checks. For example, when grant receiver 202 receives explicit uplink grant 508 and two implicit uplink grants 509 and a first channel check in time succeeds (e.g., succeeded CCA 510), data transmitter 206 may transmit three copies of the data, each in a time slot subsequent to succeeded CCA 510.

In another aspect, when uplink transmission manager component 201 determines that the first CCA does not succeed, UE 115 may proceed to 810, and channel examiner 204 may perform an additional CCA subsequent to the first time slot and data transmitter 206 may respectively transmit the one or more copies of the PDU in one or more third time slots subsequent to the additional CCA if the additional CCA succeeds. When the first channel check in time fails, channel examiner 204 may perform a second channel check in a time slot subsequent to the first channel check. If the second channel check succeeds, data transmitter 206 may only transmit two copies of the data on the uplink channel in time slots n+5 and n+6.

In another aspect of FIG. 8, an example apparatus for managing uplink transmissions in a license-assisted access (LAA) system is provided. In an aspect, the apparatus includes means for receiving an explicit uplink grant that indicates one or more implicit uplink grants. In an aspect, the apparatus also includes means for performing a first clear channel assessment (CCA) in response to the explicit uplink grant in a first time slot. In another aspect, the apparatus includes means for respectively transmitting over an unlicensed or shared spectrum copies of a protocol data unit (PDU), if the first CCA succeeds, in time slots subsequent to the first time slot, wherein a number of transmitted copies of the PDU is based at least in part on the one or more implicit uplink grants. In an aspect, the apparatus also includes means for performing an additional CCA in a time slot subsequent to the first time slot if the first CCA fails. In another aspect, the apparatus includes means for respectively transmitting over the unlicensed or shared spectrum one or more copies of the PDU in one or more time slots subsequent to a time slot in which the additional CCA succeeds.

In an aspect of FIG. 8, an example computer-readable medium storing computer executable code for managing uplink transmissions in a license-assisted access (LAA) system is provided. In an aspect, the computer-readable medium includes computer executable code for receiving an explicit uplink grant that indicates one or more implicit uplink grants. In another aspect, the computer-readable medium includes computer executable code for performing a first clear channel assessment (CCA) in response to the explicit uplink grant in a first time slot. In an aspect, the computer-readable medium includes computer executable code for respectively transmitting over an unlicensed or shared spectrum copies of a protocol data unit (PDU), if the first CCA succeeds, in time slots subsequent to the first time slot, wherein a number of transmitted copies of the PDU is based at least in part on the one or more implicit uplink grants.

In another aspect, the above mentioned example computer-readable medium may also include computer executable code for performing an additional CCA in a time slot subsequent to the first time slot if the first CCA fails. In another aspect, the above mentioned example computer-readable medium may include computer executable code for respectively transmitting over the unlicensed or shared spectrum one or more copies of the PDU in one or more time slots subsequent to a time slot in which the additional CCA succeeds.

Figure 9:
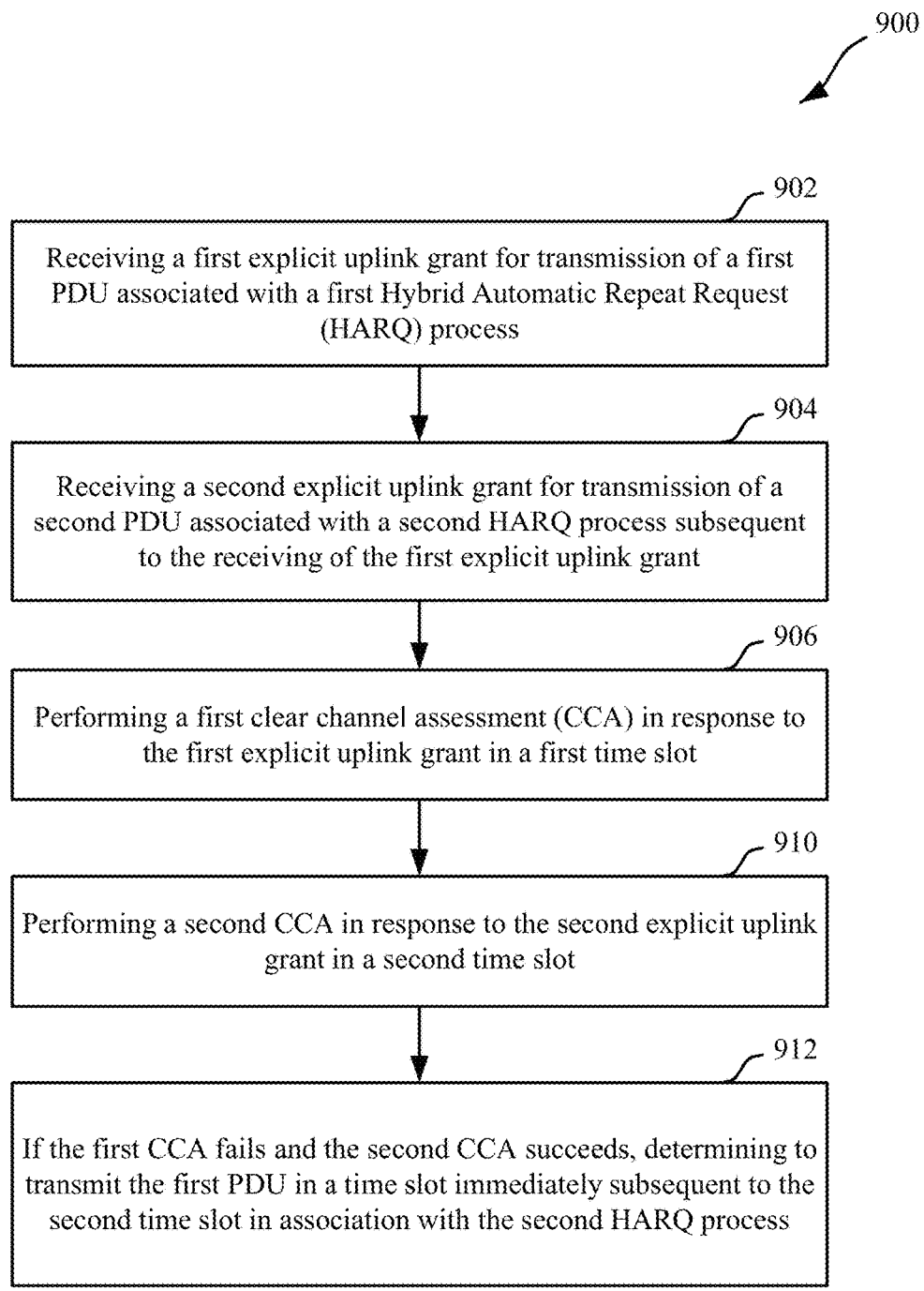
FIG. 9 is a flowchart illustrating an example of yet another method for uplink transmission management in an LAA system.

FIG. 9 is an example flowchart for uplink transmission management in an LAA system. Method 900 is described below with reference to ones of UEs 115 described with reference to FIGS. 1-3.

At 902, method 900 may include grant receiver 202 receiving a first explicit uplink grant for transmission of a first PDU associated with a first HARQ process. For example, grant receiver 202 may receive explicit uplink grant 602 at time slot n via primary cell 402. Explicit uplink grant 602 may indicate that UE 115 is authorized to transmit MAC PDU 606, MAC PDU 606 being associated with a first HARQ process.

At 904, method 900 may include grant receiver 202 receiving a second explicit uplink grant for transmission of a second PDU associated with a second HARQ process, the second explicit uplink grant being received subsequent to the first explicit uplink grant. For example, grant receiver 202 may receive, at time slot n+4, an explicit uplink grant 604 indicating that UE 115 is authorized to transmit another MAC PDU (not shown) being associated with a second HARQ process.

At 906, method 900 may include channel examiner 204 performing a first clear channel assessment (CCA) in response to the first explicit uplink grant in a first time slot. For example, channel examiner 204 may perform a channel check at time slot n+3.

At 908, method 900 may include channel examiner 204 performing a second CCA in response to the second explicit uplink grant in a second time slot. For example, channel examiner 204 may similarly perform a channel check at time slot n+7.

At 910, method 900 may include transmission determiner 210 determining whether to transmit over an unlicensed or shared spectrum the first PDU or the second PDU in a time slot subsequent to the second time slot in association with the second HARQ process if the first CCA fails and the second CCA succeeds. For example, with failed CCA 610 and succeeded CCA 608, transmission determiner 210 may determine whether to transmit MAC PDU 606 based on one or more factors including time duration 302, i.e., the time period between receiving explicit uplink grant 602 and 604, and granted size 304, i.e., the maximum size of data may be transmitted in accordance with explicit uplink grant 604. For example, if time duration 302 is greater than a predetermine threshold, which indicates that UE 115 has sufficient time to perform operations to retrieve MAC PDU 606, transmission determiner 210 may determine to transmit MAC PDU 606, rather than the other MAC PDU originally associated with the second HARQ process. As another example, if granted size 304 is greater than the size of MAC PDU 606, transmission determiner 210 may determine to transmit MAC PDU 606 and may be a portion of the other MAC PDU originally associated with the second HARQ process. As such, network entity 220 may receive PDUs in a correct order.

In an aspect, prior to transmitting MAC PDU 606, buffer manager 208 may move MAC PDU 606 from the buffer associated with the first HARQ process to another buffer associated with the second HARQ process.

In another aspect of FIG. 9, an example apparatus for managing uplink transmissions in a license-assisted access (LAA) system is provided. In an aspect, the apparatus includes means for receiving a first explicit uplink grant for transmission of a first protocol data unit (PDU) associated with a first Hybrid Automatic Repeat Request (HARQ) process. In an aspect, the apparatus also includes means for receiving a second explicit uplink grant for transmission of a second PDU associated with a second HARQ process, the second explicit uplink grant being received subsequent to the first explicit uplink grant. In another aspect, the apparatus includes means for performing a first clear channel assessment (CCA) in response to the first explicit uplink grant in a first time slot. In an aspect, the apparatus also includes means for performing a second CCA in response to the second explicit uplink grant in a second time slot. In another aspect, the apparatus includes means for determining whether to transmit over an unlicensed or shared spectrum the first PDU or the second PDU, if the first CCA fails and the second CCA succeeds, in a time slot subsequent to the second time slot in association with the second HARQ process.

Still referring FIG. 9, in another aspect, the above mentioned example apparatus may include means for storing the first PDU in a first HARQ buffer associated with the first HARQ process. In an aspect, the above mentioned example apparatus may also include means for moving the first PDU, in response to a determination being made to transmit the first PDU in association with the second HARQ process, from the first HARQ buffer to a second HARQ buffer associated with the second HARQ process. In an aspect, the above mentioned example apparatus may also include means for moving the second PDU from a MAC buffer to a second HARQ buffer associated with the second HARQ process in response to a determination being made to transmit the second PDU in association with the second HARQ process. In another aspect of the above mentioned example apparatus, the means for determining whether to transmit over the unlicensed or shared spectrum the first PDU or the second PDU is based at least in part on a difference in transmission time and/or a difference in size between the first explicit grant and the second explicit grant.

In an aspect of FIG. 9, an example computer-readable medium storing computer executable code for managing uplink transmissions in a license-assisted access (LAA) system is provided. In an aspect, the computer-readable medium includes computer executable code for receiving a first explicit uplink grant for transmission of a first protocol data unit (PDU) associated with a first Hybrid Automatic Repeat Request (HARQ) process. In another aspect, the computer-readable medium includes computer executable code for receiving a second explicit uplink grant for transmission of a second PDU associated with a second HARQ process, the second explicit uplink grant being received subsequent to the first explicit uplink grant. In an aspect, the computer-readable medium includes computer executable code for performing a first clear channel assessment (CCA) in response to the first explicit uplink grant in a first time slot. In another aspect, the computer-readable medium includes computer executable code for performing a second CCA in response to the second explicit uplink grant in a second time slot. In an aspect, the computer-readable medium includes computer executable code for determining to transmit over an unlicensed or shared spectrum the first PDU or the second PDU, if the first CCA fails and the second CCA succeeds, in a time slot subsequent to the second time slot in association with the second HARQ process.

Still referring FIG. 9, the above mentioned example computer-readable medium may, in an aspect, include computer executable code for storing the first PDU in a first HARQ buffer associated with the first HARQ process. In another aspect, the above mentioned example computer-readable medium may include computer executable code for moving the first PDU, in response to a determination being made to transmit the first PDU in association with the second HARQ process, from the first HARQ buffer to a second HARQ buffer associated with the second HARQ process. In an aspect, the above mentioned example computer-readable medium may also include computer executable code for moving the second PDU from a MAC buffer to a second HARQ buffer associated with the second HARQ process in response to a determination being made to transmit the second PDU in association with the second HARQ process. In another aspect of the above example computer-readable medium, the computer executable code for determining whether to transmit over the unlicensed or shared spectrum the first PDU or the second PDU is based at least in part on a difference in transmission time and/or a difference in size between the first explicit grant and the second explicit grant.

In an aspect of FIG. 9, another example apparatus for managing uplink transmissions in a license-assisted access (LAA) system is provided. In an aspect, the apparatus may include a memory configured to store instructions and at least one processor coupled to the memory, the at least one processor and the memory are configured to execute the instructions to perform the following features. In another aspect, the apparatus may include a grant receiver configured to receive a first explicit uplink grant for transmission of a first protocol data unit (PDU)associated with a first Hybrid Automatic Repeat Request (HARQ) process, and receive a second explicit uplink grant for transmission of a second PDU associated with a second HARQ process, the second explicit uplink grant being received subsequent to the first explicit uplink grant. In an aspect, the apparatus may include a channel examiner configured to perform a first clear channel assessment (CCA) in response to the first explicit uplink grant in a first time slot, and perform a second CCA in response to the second explicit uplink grant in a second time slot. In an aspect, the apparatus may include a transmission determiner configured to determine whether to transmit over an unlicensed or shared spectrum the first PDU or the second PDU in a time slot subsequent to the second time slot in association with the second HARQ process if the first CCA fails and the second CCA succeeds.

Still referring FIG. 9, in an aspect, the above example apparatus may further include a buffer manager configured to store the first PDU in a first HARQ buffer associated with the first HARQ process; and in response to a determination being made to transmit the first PDU in association with the second HARQ process, move the first PDU from the first HARQ buffer to a second HARQ buffer associated with the second HARQ. In another aspect, the buffer manager of the apparatus is further configured to move the second PDU from a MAC buffer to a second HARQ buffer associated with the second HARQ process in response to a determination being made to transmit the second PDU in association with the second HARQ process. In an aspect, the transmission determiner of the apparatus is configured to determine whether to transmit the first PDU or the second PDU based at least in part on a difference in transmission time and/or a difference in size between the first explicit grant and the second explicit grant.

Figure 10:
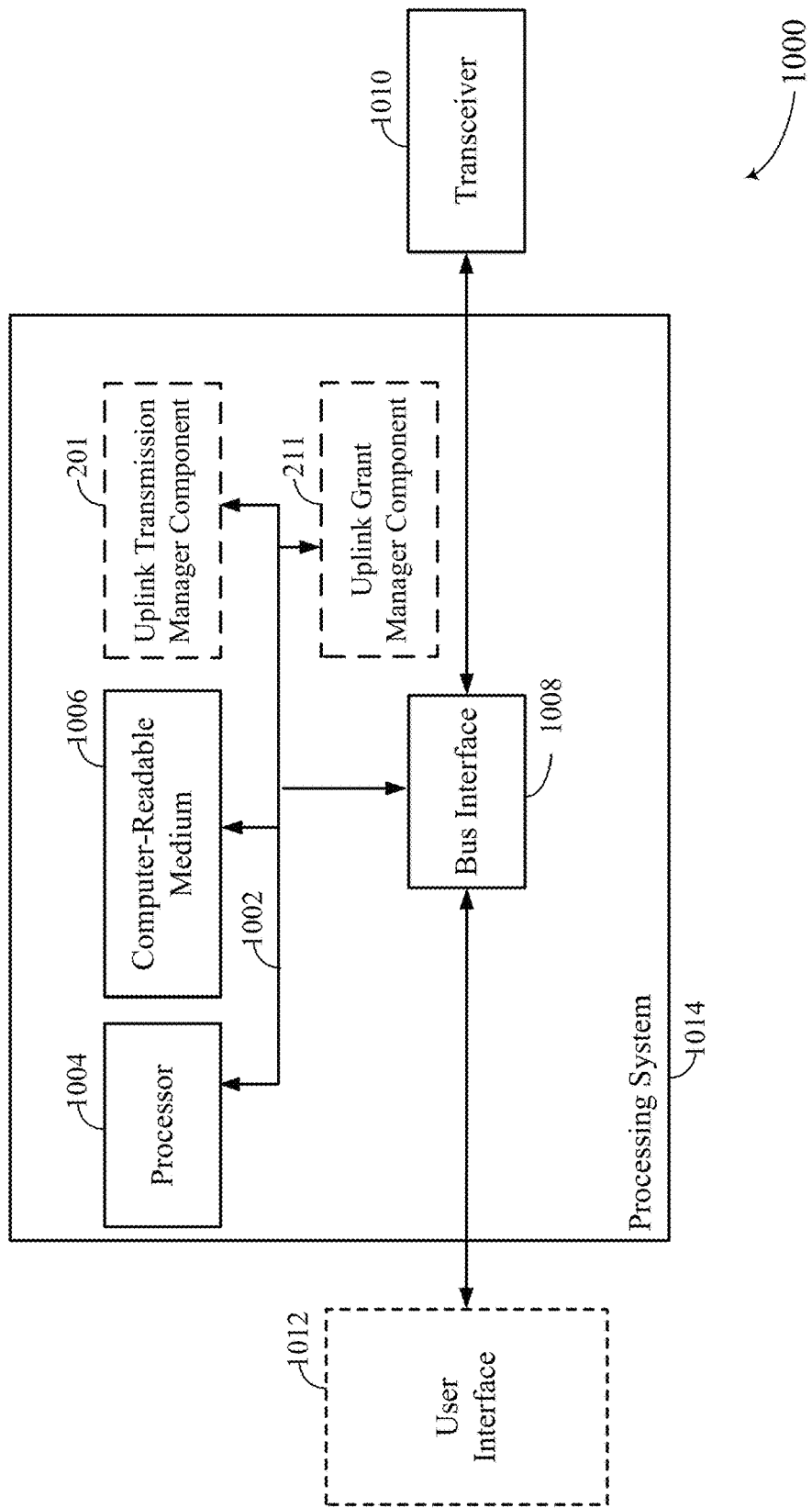
FIG. 10 is a diagram illustrating an example of a hardware implementation for an apparatus employing a processing system.

FIG. 10 is a diagram illustrating an example of a hardware implementation for an apparatus employing a processing system. In some examples, the processing system 1014 may be an example of a UE 115 or a network entity 220 described with reference to FIGS. 1-3. In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 links together various circuits including one or more processors, represented generally by the processor 1004, computer-readable media, represented generally by the computer-readable medium 1006, uplink transmission manager component 201, or uplink grant manager component 211 (see FIG. 2A), which may be configured to carry out one or more methods or procedures described herein.

In some instances, the communication management component 305 may be implemented when processing system 1014 is used in a UE 115 or network entity 220. In an aspect, uplink transmission manager component 201 and the components therein may comprise hardware, software, or a combination of hardware and software that may be configured to perform the functions, methodologies (e.g., method 400 of FIG. 4), or methods presented in the present disclosure. Uplink grant manager component 211 and the components therein may comprise hardware, software, or a combination of hardware and software that may be configured to perform the functions, methodologies (e.g., method 500 of FIG. 5), or methods presented in the present disclosure.

The bus 1002 may also link various other circuits such as timing sources, peripherals, voltage regulators and power management circuits, which are well known in the art, and therefore, will not be described any further. A bus interface 1008 provides an interface between the bus 1002 and a transceiver 1010. The transceiver 1010 provides a means for communicating with various other apparatus over a transmission medium. Depending upon the nature of the apparatus, a user interface 1012 (e.g., keypad, display, speaker, microphone, joystick) may also be provided.

The processor 1004 is responsible for managing the bus 1002 and general processing, including the execution of software stored on the computer-readable medium 1006. The software, when executed by the processor 1004, causes the processing system 1014 to perform the various functions described infra for any particular apparatus. The computer-readable medium 1006 may also be used for storing data that is manipulated by the processor 1004 when executing software. In some aspects, at least a portion of the functions, methodologies, or methods associated with the uplink transmission manager component 201 or uplink grant manager component 211 may be performed or implemented by the processor 1004 and/or the computer-readable medium 1006.

In some examples, the computer-readable medium 1006 may store code for wireless communications. The code may comprise instructions executable by a computer (e.g., processor 1004) for monitoring one or more wireless channels for one or more trigger conditions, for transmitting a probe signal over a first wireless channel of the one or more wireless channels to access a network entity when the one or more trigger conditions are met on the first wireless channel, wherein properties of the probe signal are based at least on a type of access with the network entity; and for receiving a response signal from the network entity in response to the probe signal, the response signal including information to enable access by the first wireless device.

Figure 11:
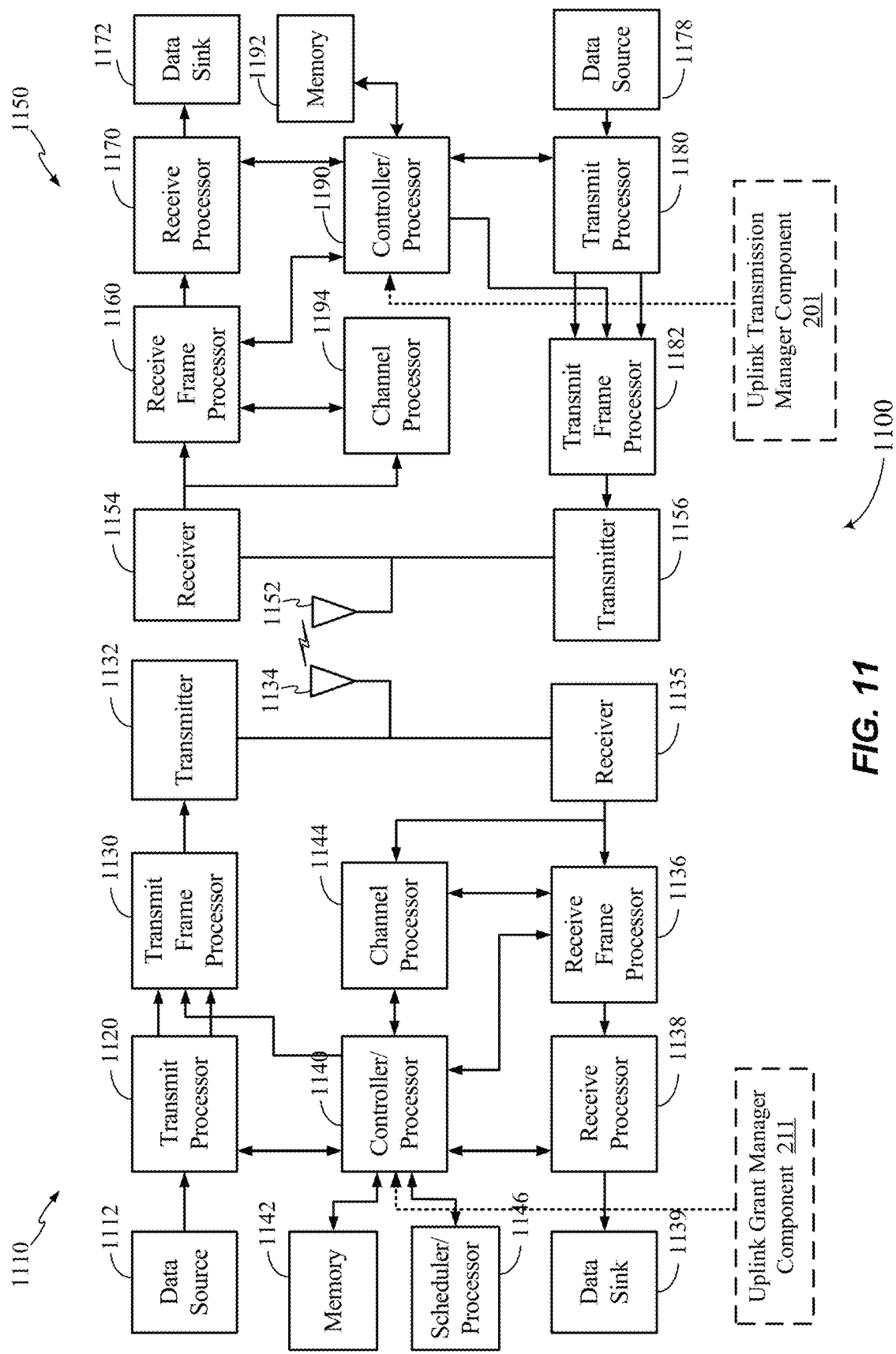
FIG. 11 is a diagram illustrating an example of a network entity (e.g., a base station or an access point) in communication with a UE in a telecommunication system having aspects configured for uplink transmission management.

Referring to FIG. 11, a Node B 1110 is in communication with a UE 1150 and having aspects configured to manage cell update messages. In an aspect, the Node B 1110 may be an example of a network entity 220 associated with core network 130 of FIGS. 2A and 2B, executing uplink grant manager component 211. In an aspect, the UE 1150 may be an example of UE 115 of FIGS. 1, 2A, and 2C, executing uplink transmission manager component 201. In the downlink communication, a transmit processor 1120 may receive data from a data source 1112 and control signals from a controller/processor 1140. The transmit processor 1120 provides various signal processing functions for the data and control signals, as well as reference signals (e.g., pilot signals). For example, the transmit processor 1120 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1144 may be used by a controller/processor 1140 to determine the coding, modulation, spreading, and/or scrambling schemes for the transmit processor 1120. These channel estimates may be derived from a reference signal transmitted by the UE 1150 or from feedback from the UE 1150. The symbols generated by the transmit processor 1120 are provided to a transmit frame processor 1130 to create a frame structure. The transmit frame processor 1130 creates this frame structure by multiplexing the symbols with information from the controller/processor 1140, resulting in a series of frames. The frames are then provided to a transmitter 1132, which provides various signal conditioning functions including amplifying, filtering, and modulating the frames onto a carrier for downlink transmission over the wireless medium through antenna 1134. The antenna 1134 may include one or more antennas, for example, including beam steering bidirectional adaptive antenna arrays or other similar beam technologies.

At the UE 1150, a receiver 1154 receives the downlink transmission through an antenna 1152 and processes the transmission to recover the information modulated onto the carrier. The information recovered by the receiver 1154 is provided to a receive frame processor 1160, which parses each frame, and provides information from the frames to a channel processor 1194 and the data, control, and reference signals to a receive processor 1170. The receive processor 1170 then performs the inverse of the processing performed by the transmit processor 1120 in the Node B 1110. More specifically, the receive processor 1170 descrambles and dispreads the symbols, and then determines the most likely signal constellation points transmitted by the Node B 1110 based on the modulation scheme. These soft decisions may be based on channel estimates computed by the channel processor 1194. The soft decisions are then decoded and de-interleaved to recover the data, control, and reference signals. The CRC codes are then checked to determine whether the frames were successfully decoded. The data carried by the successfully decoded frames will then be provided to a data sink 1172, which represents applications running in the UE 1150 and/or various user interfaces (e.g., display). Control signals carried by successfully decoded frames will be provided to a controller/processor 1190. When frames are unsuccessfully decoded by the receive processor 1170, the controller/processor 1190 may also use an acknowledgement (ACK) and/or negative acknowledgement (NACK) protocol to support retransmission requests for those frames.

In the uplink channel, data from a data source 1178 and control signals from the controller/processor 1190 are provided to a transmit processor 1180. The data source 1178 may represent applications running in the UE 1150 and various user interfaces (e.g., keyboard). Similar to the functionality described in connection with the downlink transmission by the Node B 1110, the transmit processor 1180 provides various signal processing functions including CRC codes, coding and interleaving to facilitate FEC, mapping to signal constellations, spreading with OVSFs, and scrambling to produce a series of symbols. Channel estimates, derived by the channel processor 1194 from a reference signal transmitted by the Node B 1110 or from feedback contained in the midamble transmitted by the Node B 1110, may be used to select the appropriate coding, modulation, spreading, and/or scrambling schemes. The symbols produced by the transmit processor 1180 will be provided to a transmit frame processor 1182 to create a frame structure. The transmit frame processor 1182 creates this frame structure by multiplexing the symbols with information from the controller/processor 1190, resulting in a series of frames. The frames are then provided to a transmitter 1156, which provides various signal conditioning functions including amplification, filtering, and modulating the frames onto a carrier for uplink transmission over the wireless medium through the antenna 1152.

The uplink transmission is processed at the Node B 1110 in a manner similar to that described in connection with the receiver function at the UE 1150. A receiver 1135 receives the uplink transmission through the antenna 1134 and processes the transmission to recover the information modulated onto the carrier. The information recovered by the receiver 1135 is provided to a receive frame processor 1136, which parses each frame, and provides information from the frames to the channel processor 1144 and the data, control, and reference signals to a receive processor 1138. The receive processor 1138 performs the inverse of the processing performed by the transmit processor 1180 in the UE 1150. The data and control signals carried by the successfully decoded frames may then be provided to a data sink 1139 and the controller/processor, respectively. If some of the frames were unsuccessfully decoded by the receive processor, the controller/processor 1140 may also use an acknowledgement (ACK) and/or negative acknowledgement (NACK) protocol to support retransmission requests for those frames.

The controller/processors 1140 and 1190 may be used to direct the operation at the Node B 1110 and the UE 1150, respectively. For example, the controller/processors 1140 and 1190 may provide various functions including timing, peripheral interfaces, voltage regulation, power management, transmission management, and other control functions. The computer readable media of memories 1142 and 1192 may store data and software for the Node B 1110 and the UE 1150, respectively. A scheduler/processor 1146 at the Node B 1110 may be used to allocate resources to the UEs and schedule downlink and/or uplink transmissions for the UEs. In an aspect, uplink grant manager component 211 may communicate with the controller/processors 1140 at the Node B 1110 for managing uplink grants, and uplink transmission manager component 201 may communicate with the controller/processors 1190 at the UE 1150 for managing uplink transmissions.

The detailed description set forth above in connection with the appended drawings describes example embodiments and does not represent all the embodiments that may be implemented or that are within the scope of the claims. The term "exemplary," as used in this description, means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media may comprise RAM, ROM, electrically erasable programmable read only memory (EEPROM), compact disk (CD) ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile Communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication, comprising:
   receiving an uplink grant, said uplink grant scheduling multiple time slots for uplink transmission over a shared spectrum;
   performing clear channel assessment (CCA) sequentially for the multiple time slots, starting with a first time slot of the multiple time slots, until the CCA succeeds for a particular time slot of the multiple time slots; and
   transmitting data in the particular time slot over the shared spectrum.

2. The method of claim 1, wherein the multiple time slots are consecutive in time.

3. The method of claim 1, wherein the CCA for a time slot of the multiple time slots is performed in another time slot immediately before the time slot.

4. The method of claim 1, further comprising:
   transmitting the data in at least one of the multiple time slots subsequent to the particular time slot.

5. The method of claim 1, wherein the uplink grant is received from a primary cell.

6. The method of claim 1, wherein the data is transmitted over a secondary cell in the shared spectrum.

7. The method of claim 1, wherein the data comprise a medium access control (MAC) protocol data unit (PDU).

8. A user equipment (UE), comprising:
   a memory configured to store instructions; and
   at least one processor coupled to the memory, the at least one processor and the memory are configured to execute the instructions to:
   receive an uplink grant, said uplink grant scheduling multiple time slots for uplink transmission over a shared spectrum;
   perform clear channel assessment (CCA) sequentially for the multiple time slots, starting with a first time slot of the multiple time slots, until the CCA succeeds for a particular time slot of the multiple time slots; and
   transmit data in the particular time slot over the shared spectrum.

9. The UE of claim 8, wherein the multiple time slots are consecutive in time.

10. The UE of claim 8, wherein the CCA for a time slot of the multiple time slots is performed in another time slot immediately before the time slot.

11. The UE of claim 8, wherein the at least one processor and the memory are further configured to:
   transmit the data in at least one of the multiple time slots subsequent to the particular time slot.

12. The UE of claim 8, wherein the uplink grant is received from a primary cell.

13. The UE of claim 8, wherein the data is transmitted over a secondary cell in the shared spectrum.

14. The UE of claim 8, wherein the data comprise a medium access control (MAC) protocol data unit (PDU).

15. An apparatus of wireless communication, comprising:
   means for receiving an uplink grant, said uplink grant scheduling multiple time slots for uplink transmission over a shared spectrum;
   means for performing clear channel assessment (CCA) sequentially for the multiple time slots, starting with a first time slot of the multiple time slots, until the CCA succeeds for a particular time slot of the multiple time slots; and
   means for transmitting data in the particular time slot over the shared spectrum.

16. The apparatus of claim 15, wherein the multiple time slots are consecutive in time.

17. The apparatus of claim 15, wherein the CCA for a time slot of the multiple time slots is performed in another time slot immediately before the time slot.

18. The apparatus of claim 15, further comprising:
   means for transmitting the data in at least one of the multiple time slots subsequent to the particular time slot.

19. A non-transitory computer-readable medium having instructions stored thereon, the instructions comprising codes executable for a user equipment (UE) to perform:
   receiving an uplink grant, said uplink grant scheduling multiple time slots for uplink transmission over a shared spectrum;
   performing clear channel assessment (CCA) sequentially for the multiple time slots, starting with a first time slot of the multiple time slots, until the CCA succeeds for a particular time slot of the multiple time slots; and
   transmitting data in the particular time slot over the shared spectrum.

20. The non-transitory computer-readable medium of claim 19, wherein the multiple time slots are consecutive in time.

21. The non-transitory computer-readable medium of claim 19, wherein the CCA for a time slot of the multiple time slots is performed in another time slot immediately before the time slot.

22. The non-transitory computer-readable medium of claim 19, wherein the instructions further comprise:
   codes for transmitting the data in at least one of the multiple time slots subsequent to the particular time slot.

* * * * *